US008463074B2

(12) United States Patent  
Johnson, III et al.

(10) Patent No.: US 8,463,074 B2
(45) Date of Patent: Jun. 11, 2013

(54) SYSTEM AND METHOD FOR ROTATING IMAGES

(75) Inventors: Rousey Johnson, III, Prior Lake, MN (US); Stephen Fuchs, Victoria, MN (US); Tracey Tschepen, Savage, MN (US)

(73) Assignee: General Dynamics Advanced Information Systems, Fairfax, VA (US)

( * ) Notice: Subject to any disclaimer, the term of this patent is extended or adjusted under 35 U.S.C. 154(b) by 233 days.

(21) Appl. No.: 12/926,343

(22) Filed: Nov. 10, 2010

(65) Prior Publication Data

US 2011/0110606 A1     May 12, 2011

Related U.S. Application Data

(60) Provisional application No. 61/260,156, filed on Nov. 11, 2009.

(51) Int. Cl.
*G06K 9/32*     (2006.01)

(52) U.S. Cl.
USPC ........... 382/296; 348/583; 345/648; 345/649; 345/650; 345/651

(58) Field of Classification Search
USPC ....................................................... 382/296
See application file for complete search history.

(56) References Cited

U.S. PATENT DOCUMENTS

| | | | |
|---|---|---|---|
| 5,497,498 A | 3/1996 | Taylor | |
| 5,818,962 A * | 10/1998 | Mizukami | 382/180 |
| 5,818,976 A * | 10/1998 | Pasco et al. | 382/289 |
| 5,857,109 A | 1/1999 | Taylor | |
| 5,912,995 A * | 6/1999 | He | 382/297 |
| 6,157,747 A * | 12/2000 | Szeliski et al. | 382/284 |
| 6,175,371 B1 * | 1/2001 | Schoulz et al. | 345/630 |
| 6,195,472 B1 * | 2/2001 | So et al. | 382/296 |
| 6,360,026 B1 * | 3/2002 | Kulkarni et al. | 382/289 |
| 6,636,649 B1 * | 10/2003 | Murata et al. | 382/295 |
| 6,683,996 B1 * | 1/2004 | Walmsley | 382/296 |
| 6,801,674 B1 | 10/2004 | Turney | |
| 7,013,039 B2 * | 3/2006 | Sugawara | 382/151 |
| 7,085,433 B2 | 8/2006 | Reiners | |
| 7,095,893 B2 | 8/2006 | Reiners | |
| 7,113,652 B2 | 9/2006 | Reiners | |
| 7,280,710 B1 | 10/2007 | Castro-Pareja et al. | |
| 7,305,146 B2 * | 12/2007 | Cheatle | 382/296 |
| 7,327,375 B2 * | 2/2008 | Hayashi | 345/646 |
| 7,415,168 B2 * | 8/2008 | Yamamoto | 382/289 |
| 7,567,728 B2 * | 7/2009 | Fujimoto | 382/276 |

(Continued)

*Primary Examiner* — Chan Park
*Assistant Examiner* — Iman K Kholdebarin
(74) *Attorney, Agent, or Firm* — Ingrassia Fisher & Lorenz, P.C.

(57) ABSTRACT

A system and method for rotating a source image by a first non-zero angle is provided. The method includes: defining a template for the source image, the template representing a rotation of the source image about an axis of the source image by second angle, where the second angle is the negative of the first non-zero angle; determining overlap between the template and the source image; separating the template into a plurality of strips covering at least the area of overlap; and for each strip: indentifying an initial pixel in the source image within the strip and storing the image data of the initial pixel; storing the image data of all remaining pixels within both the strip and the overlap in a database format in which the all remaining pixels is defined by a Y and X offset from the initial pixel.

13 Claims, 25 Drawing Sheets

U.S. PATENT DOCUMENTS

| | | | |
|---|---|---|---|
| 7,693,347 B2 * | 4/2010 | Fainstain et al. | 382/289 |
| 7,822,292 B2 * | 10/2010 | Jin | 382/296 |
| 7,995,866 B2 * | 8/2011 | Nagahashi | 382/296 |
| 8,023,772 B2 * | 9/2011 | Jin | 382/296 |
| 8,139,895 B2 * | 3/2012 | Nishimura et al. | 382/296 |
| 2002/0196467 A1 * | 12/2002 | Delhoune et al. | 358/1.18 |
| 2003/0095722 A1 * | 5/2003 | Regimbal | 382/296 |
| 2004/0076341 A1 * | 4/2004 | Dolan | 382/289 |
| 2004/0131280 A1 | 7/2004 | Reiners | |
| 2004/0131281 A1 | 7/2004 | Reiners | |
| 2004/0136611 A1 | 7/2004 | Reiners | |
| 2004/0252913 A1 * | 12/2004 | Ahn | 382/296 |
| 2007/0014347 A1 | 1/2007 | Prechtl et al. | |
| 2007/0024701 A1 | 2/2007 | Prechtl et al. | |
| 2007/0126863 A1 | 6/2007 | Prechtl et al. | |
| 2008/0025641 A1 * | 1/2008 | Lee | 382/296 |
| 2008/0144973 A1 * | 6/2008 | Jin | 382/296 |
| 2008/0205755 A1 | 8/2008 | Jackson et al. | |
| 2009/0022426 A1 * | 1/2009 | Yamazaki | 382/296 |
| 2009/0040308 A1 * | 2/2009 | Temovskiy | 348/158 |
| 2010/0054595 A1 * | 3/2010 | Demandolx et al. | 382/170 |
| 2012/0207347 A1 * | 8/2012 | Albu et al. | 382/103 |

* cited by examiner

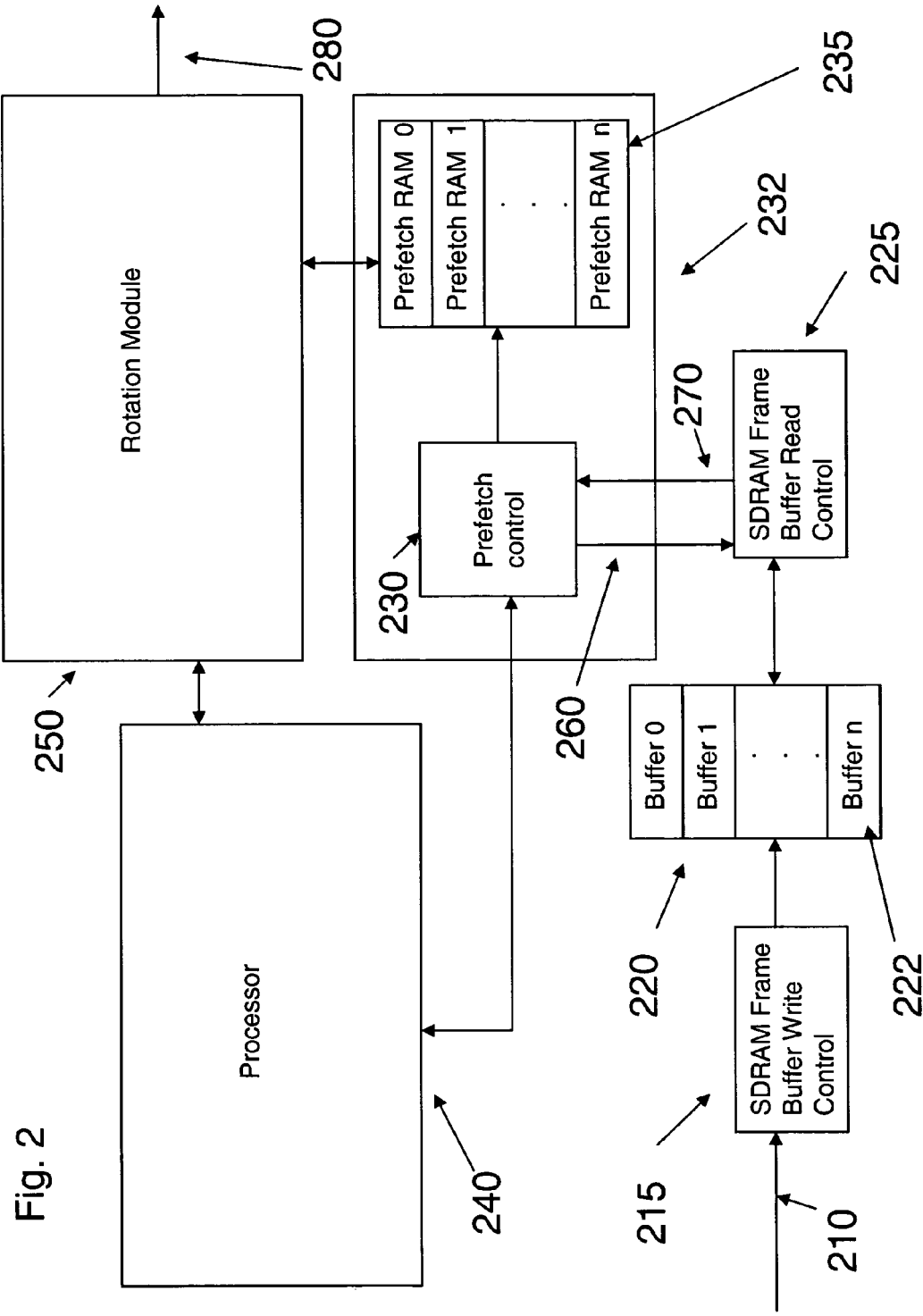

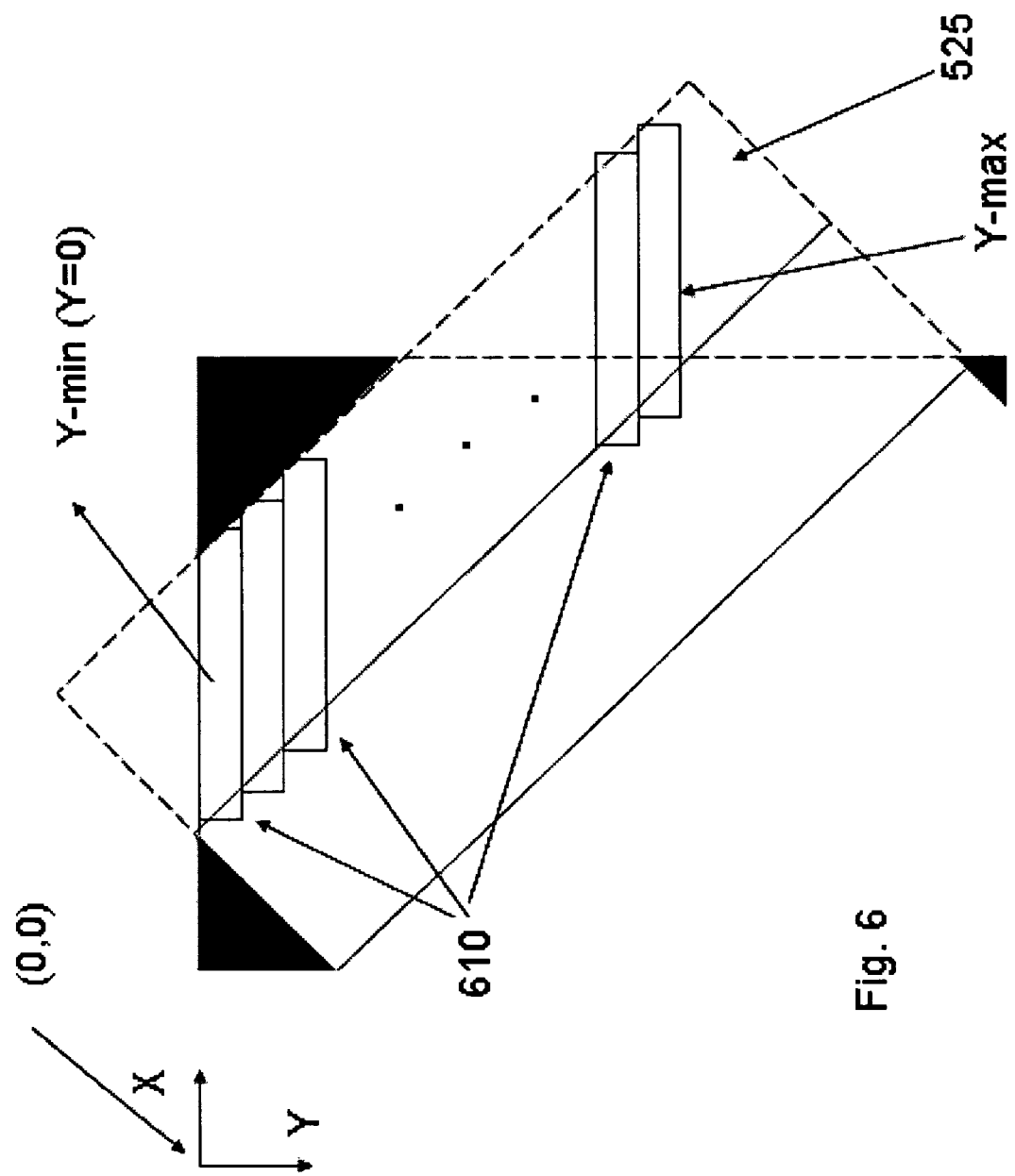

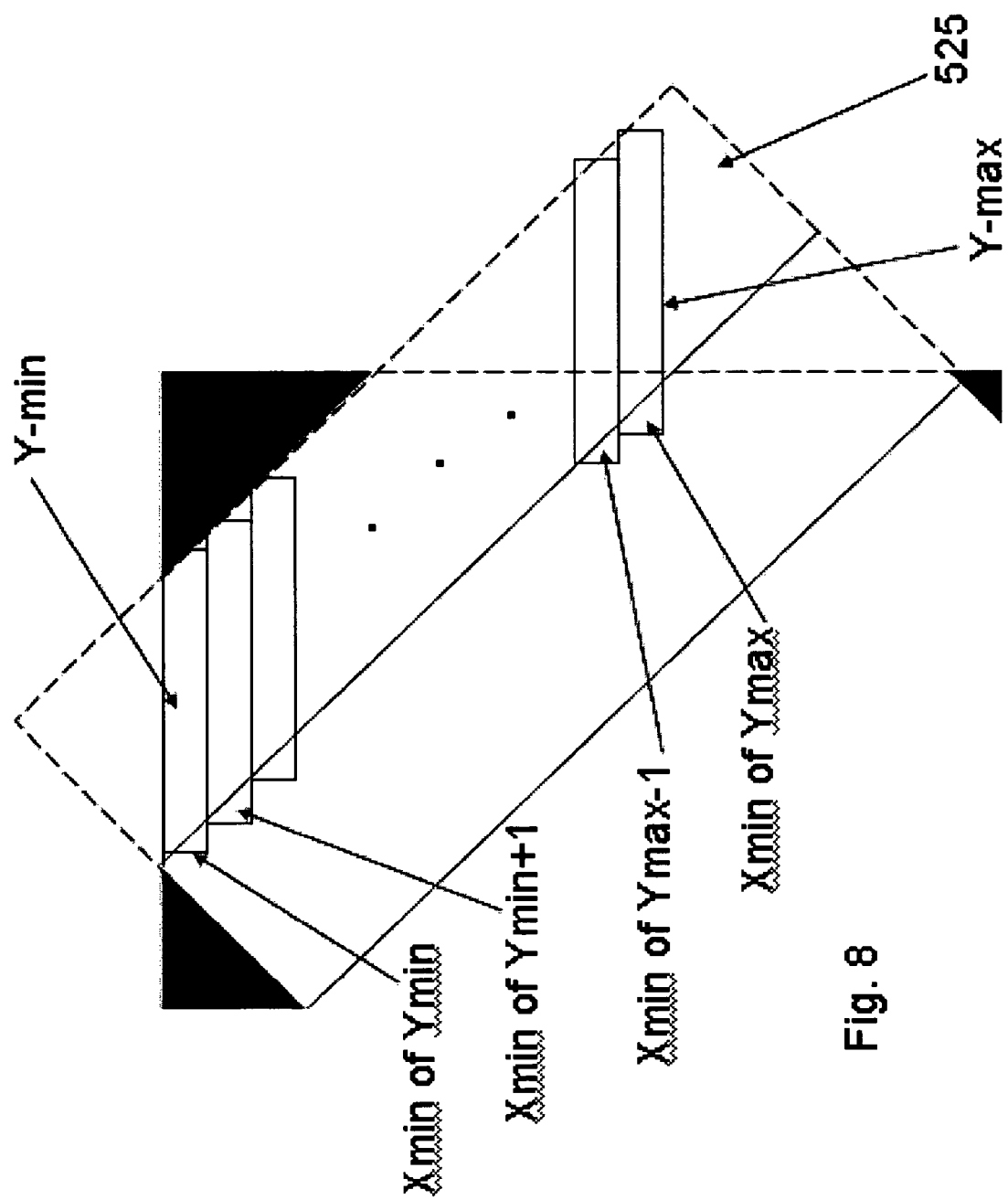

SYSTEM AND METHOD FOR ROTATING IMAGES

CROSS REFERENCE TO RELATED APPLICATIONS

The instant application related to U.S. Provisional Patent application No. 61/260,156 entitled SYSTEM AND METHOD FOR ROTATING IMAGES filed on Nov. 11, 2009, the contents of which are incorporated by reference herein in its entirety.

BACKGROUND OF THE INVENTION

1. Field of the Invention

The present invention relates to rotation of images. More specifically, the present invention relates to rotation of images without leveraging an external SRAM chip.

2. Discussion of Background Information

Rotation of images is a relatively common task. In the prior art, the system will calculate the location and retrieve a single source pixel for each destination pixel, and thereby reconstruct the image. The original image is referred to herein as the "source image" and the resulting rotated image is referred to herein as the "destination image."

Typically, the angle of rotation of the image will not generate a pixel-to-pixel correspondence between the source image and the destination image; more likely, the destination pixel would include portions of several adjacent pixels in the source image. A basic rotation technique is simply to select the source image with the most overlap with the desired location in the destination image, but this tends to produce a degraded destination image. A more robust technique known as "anti-aliasing" identifies several pixels in the source image that are proximate to the desired location, and essentially derives the pixel for the destination image based on the surrounding pixels in the source image. This methodology produces destination images with considerably more accuracy.

A drawback of anti-aliasing is its resource-intensive nature, in that multiple pixels need to be analyzed in order to create one pixel of any image. In both a system with a central processing unit and a system utilizing application specific digital video signal processing hardware, the primary restriction in the process is in retrieving single pixel data from an image frame buffer. The process requires continual fast accesses to non-linear pixel locations within a stored image; therefore, high speed internal random access memory (RAM) is preferred. Unfortunately, these systems have only small amounts of high speed internal random access memory that must be shared by many video processing tasks.

Processing is therefore typically offloaded to an external RAM device, such as a dynamic RAM (DRAM), and more specifically a double data rate SDRAM (DDR SDRAM). The benefits of SDRAM for a video system design include low power consumption, high bandwidth, availability in high densities, and low cost-per-byte.

However, DRAMS are poor options for use in rotation of images. This is because DDR SDRAM gets its highest bandwidth by completing a transfer of many burst accesses to successive columns within the same bank row of its architecture. Conversely, DDR SDRAM gets its worst bandwidth when completing multiple transfers of single-word accesses to different banks, rows, and columns in a truly random fashion. The inefficiencies of having to close a row and then reopen a different bank row and column for each access, having to refresh the DRAM, and using only a single word of the required multiword minimum burst makes a DRAM an impractical solution for image rotation.

Another type of external memory is SRAM. Because of its architecture, SRAM is better designed to support single-word accesses to random locations within its structure. SRAM, in comparison to DDR SDRAM, is higher power, also allows high bandwidth, is available in lower densities, and has a noticeably higher cost-per-byte. Most of the functions within a video processing architecture are best suited to use the SDRAM burst access method. Taking this access method preference into consideration, along with the benefits of SDRAM, results in SDRAM being chosen as the primary external memory. That leaves a designer to add SRAM as a secondary addition to the primary memory choice. In most cases, the added power, cost, weight, space, and interfacing I/O make this a very expensive, both in terms of resources and in pricing, addition to a system with the only purpose of supporting the rotation algorithm. SRAM also has a relatively short lifespan in that design configurations change every 3-5 years, thereby making replacement of SRAM on board problematic.

SUMMARY OF THE INVENTION

According to an embodiment of the invention, a method for rotating a source image by a first non-zero angle is provided. The method includes: defining a template for the source image, the template representing a rotation of the source image about an axis of the source image by second angle, where the second angle is the negative of the first non-zero angle; determining overlap between the template and the source image; separating the template into a plurality of strips covering at least the area of overlap; and for each strip: identifying an initial pixel in the source image within the strip and storing the image data of the initial pixel; storing the image data of all remaining pixels within both the strip and the overlap in a database format in which the all remaining pixels is defined by a Y and X offset from the initial pixel.

The above embodiment may have various features. The method may include constructing a desired rotated image from the source image, which itself includes: for each pixel in the rotated destination image, identifying at least one pixel from the source image that corresponds to the source image as rotated per the first angle. The identifying may include: identifying the strip that corresponds to the target section of the source image; using the X and Y offset data to locate the image data in the database format. The initial pixel with each strip may be the highest Y coordinate and leftmost X coordinate within each strip. The storing the image data of all remaining pixels within both the strip and the overlap may further include determining the initial pixel with coordinates in the source image as Ymin and Xmin; establishing an origin pixel as having Y=Ymin and X=Xmin; obtaining the image data sequentially for the origin pixel and each horizontally adjacent pixel from the origin pixel until the end of the overlap is reached, storing the image data in a database format in which each horizontally adjacent pixel is defined by the offset from Ymin and an offset from Xmin; incrementing the Ymin by one if there are any remaining pixel rows within both the strip and the overlap; and repeating at least the establishing, obtaining, storing and incrementing until all of the pixels within both the strip and the overlap are stored. The each of the strips may at least partially overlap with adjacent strips. The strips may be substantially parallel and/or substantially rectangular. The image data for portions of the strips that do not overlap the source image may be ignored or stored in memory as representative of dead zone data.

According to another embodiment of the invention, a method for rotating a source image by a first non-zero angle is provided. The method includes: defining a template for the source image, the template representing a rotation of the source image about an axis of the source image by second angle, where the second angle is the negative of the first non-zero angle; determining overlap between the template and the source image; and separating the template into a plurality of strips covering at least the area of overlap. For each strip, the method includes: determining the initial pixel with coordinates in the source image of the corresponding strip as Ymin and Xmin; establishing an origin pixel as having Y=Ymin and X=Xmin; obtaining the image data sequentially for the origin pixel and each horizontally adjacent pixel from the origin pixel until the end of the overlap is reached; storing the image data in a database format in which each horizontally adjacent pixel is defined by the offset from Y and an offset from X; incrementing the Ymin by one if there are any remaining pixel rows within both the corresponding strip and the overlap; and repeating at least the establishing, obtaining, storing and incrementing until all of the pixels within both the strip and the overlap are stored.

The above embodiment may include various optional features. For each pixel in the rotated destination image, the method may further include identifying at least one pixel from the source image that corresponds to the source image as rotated per the first angle, where the identifying includes: identifying the strip that corresponds to the target section of the source image; and using the X and Y offset data to locate the image data in the database format. The initial pixel with each strip may be the highest Y coordinate and leftmost X coordinate within each strip. Each of the strips may at least partially overlap with adjacent strips. The strips may be substantially parallel and/or substantially rectangular. The image data for portions of the strips that do not overlap the source image may be ignored or stored in memory as representative of dead zone data.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 2 illustrates an architecture of an embodiment of the invention;

FIG. 6 illustrates the identification of Y coordinates of pixel rows of the source image within strips within the destination template;

FIG. 8 illustrates identification of the X coordinates of the left most portion of pixel rows of the source image within strips within the destination template;

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1B:
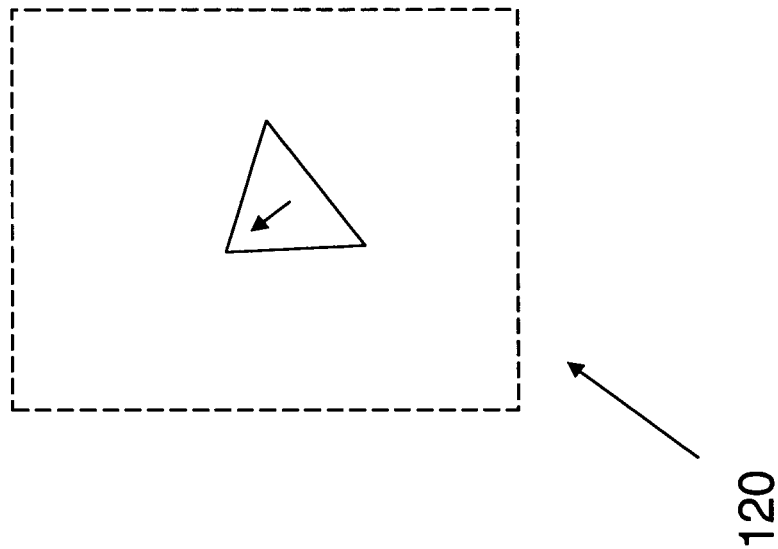
FIGS. 1A and 1B illustrate a source image and a desired rotation of the source image.
Figure 1A:
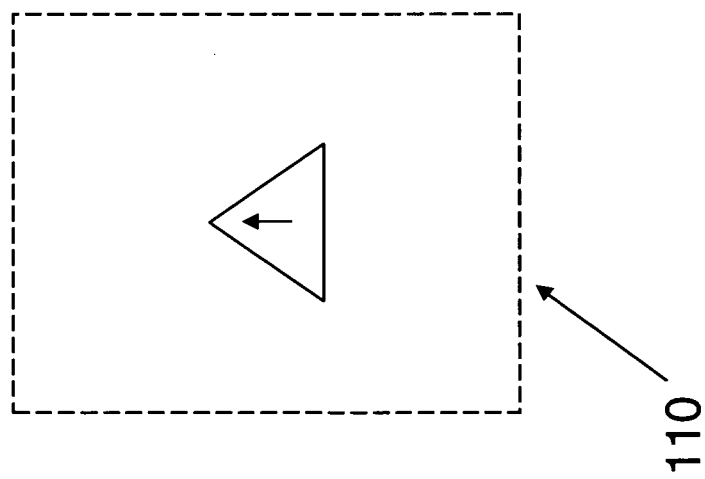

Referring now to FIGS. 1A and 1B, a source image 110 is shown, in which the dotted outline of the image represents the boundaries, of source image 110, and the square represents the contents of source image 110. The system in the instant embodiment wishes to rotate that image into the orientation shown in 120. The angle of rotation in the noted figures is approximately 30 degrees counter clockwise for illustrative purposes, although the invention is not limited to any particular angel of rotation. For illustrative simplicity, source image 110 and destination image 120 are identical in size. Thus, the frame width and the frame height will apply synonymously to both the input source image and the destination image. However, the invention is not so limited, and the sizes may be different.

Referring now to FIG. 2, a basic hardware architecture for implementing the rotational algorithm is shown. In incoming pixel data 210 input, such as a video feed, includes (either in its entirety or streaming) a frame with source image 110. An SDRAM frame write control 215 writes the incoming pixel data 210 into a frame buffer array 220 with 1-$n$ buffers 222, such that each buffer in array 220 stores one frame of pixel data (the source image 110 will be such a frame). Buffer array 220 may include a single buffer or multiple buffers, although two is preferable (one for reaching an incoming frame and one for outputting a prior frame).

An SDRAM read control 225 will read out portions of a selected frame under control of a prefetch control 230 for storage in a prefetch memory 235. A processor module 240 calculates, based at least on the parameters of the source image 110 and destination image 120, control information to instruct prefetch control 230 of a prefetch module 232 on how to interact with SDRAM read control 225 to scan the source image 110 as stored within a buffer of buffer array 220. A rotation module 250 cooperates with processor 230 and prefetch control to generate the destination image 120.

Figure 3:
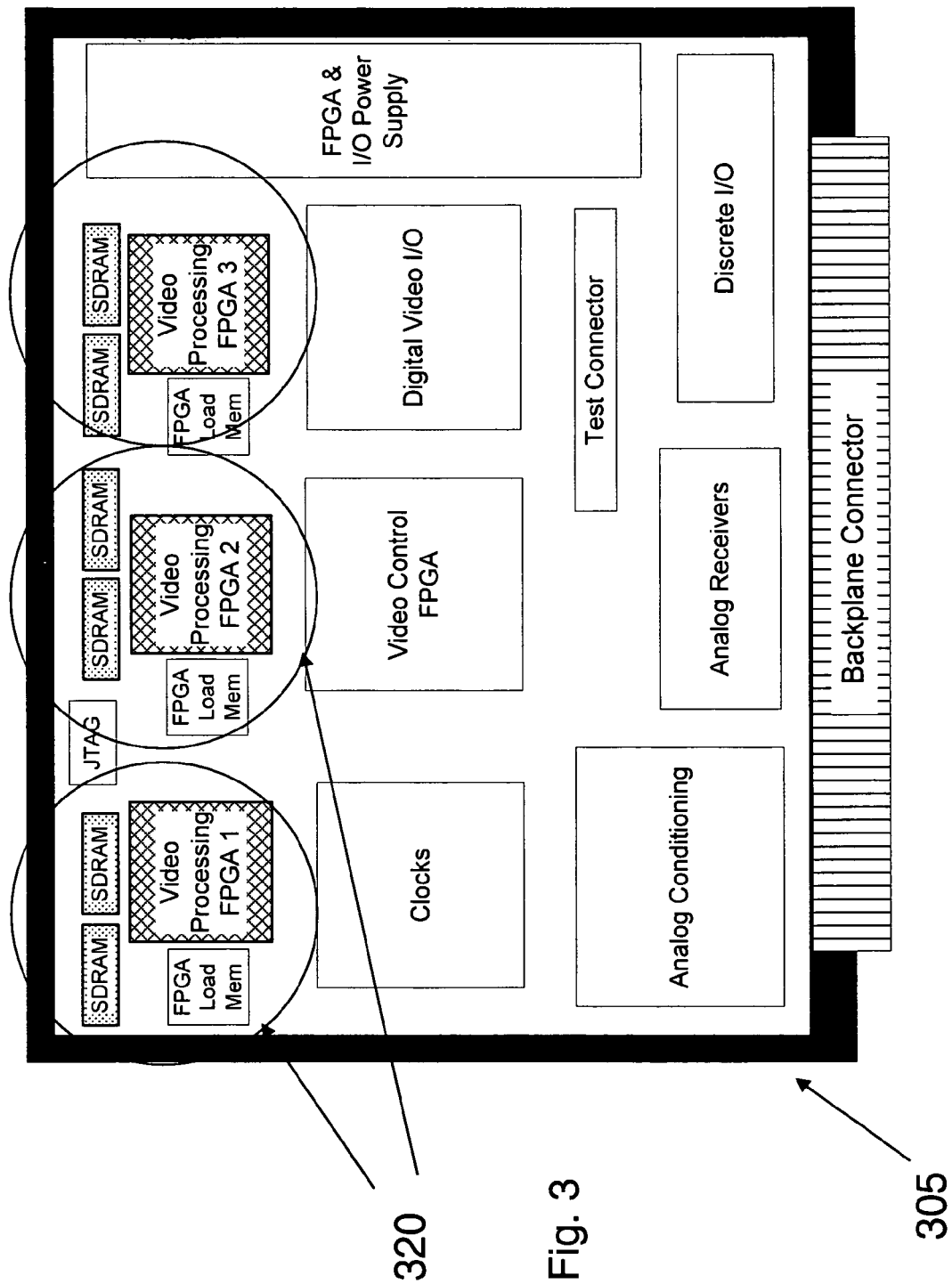
FIG. 3 illustrates an architecture of an embodiment of the invention.
Figure 11:
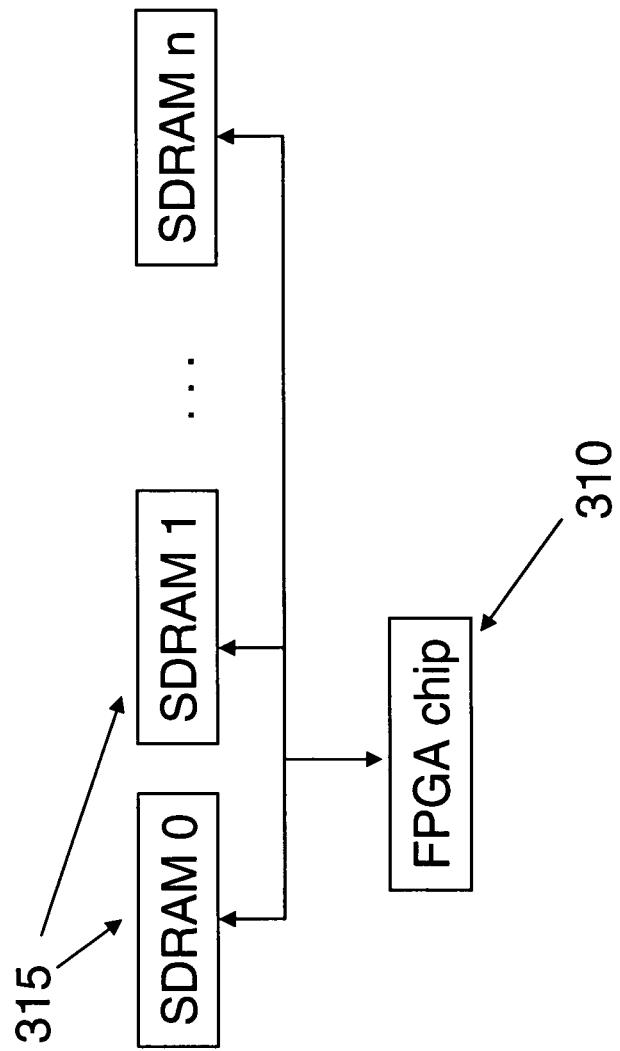
FIG. 11 illustrates an architecture of an embodiment of the invention.
Figure 12:
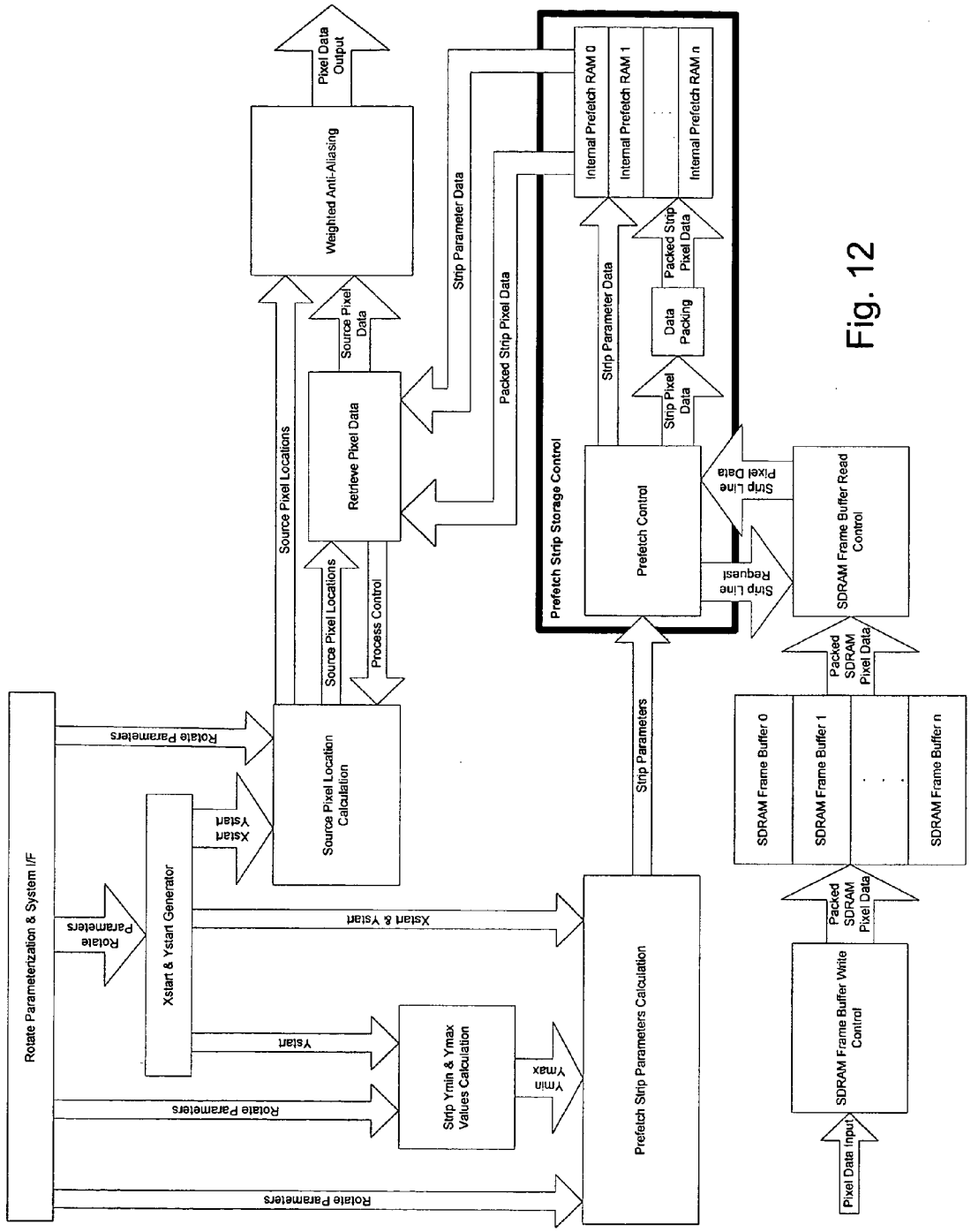
FIG. 12 illustrates a block diagram of an embodiment of the invention.
Figure 13:
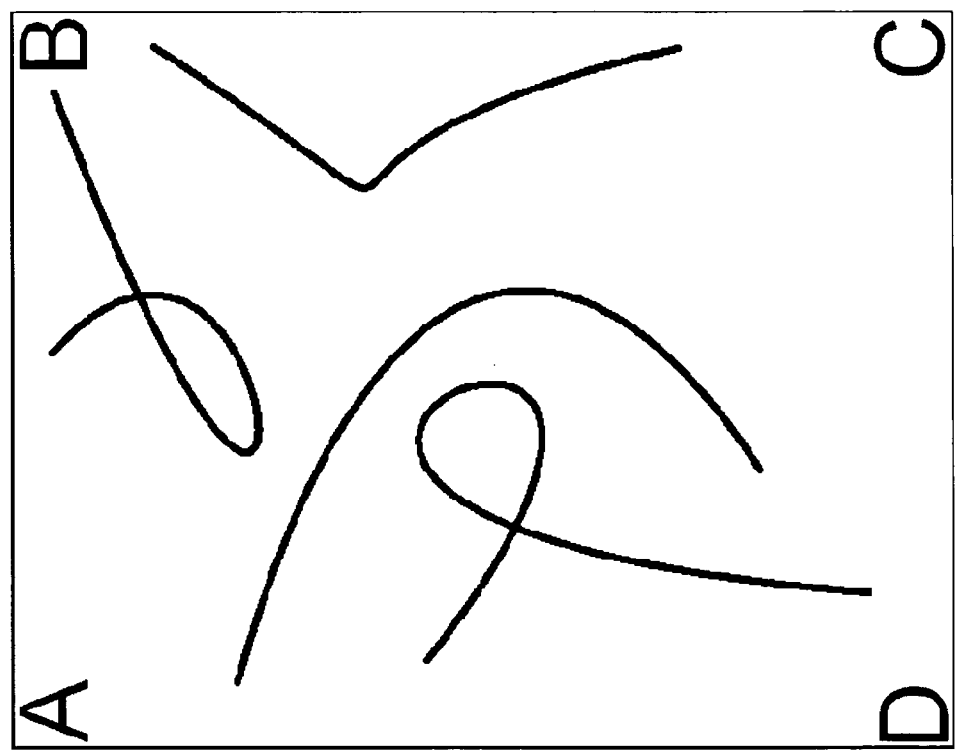
FIG. 13 illustrates a source image for rotation.
Figure 14:
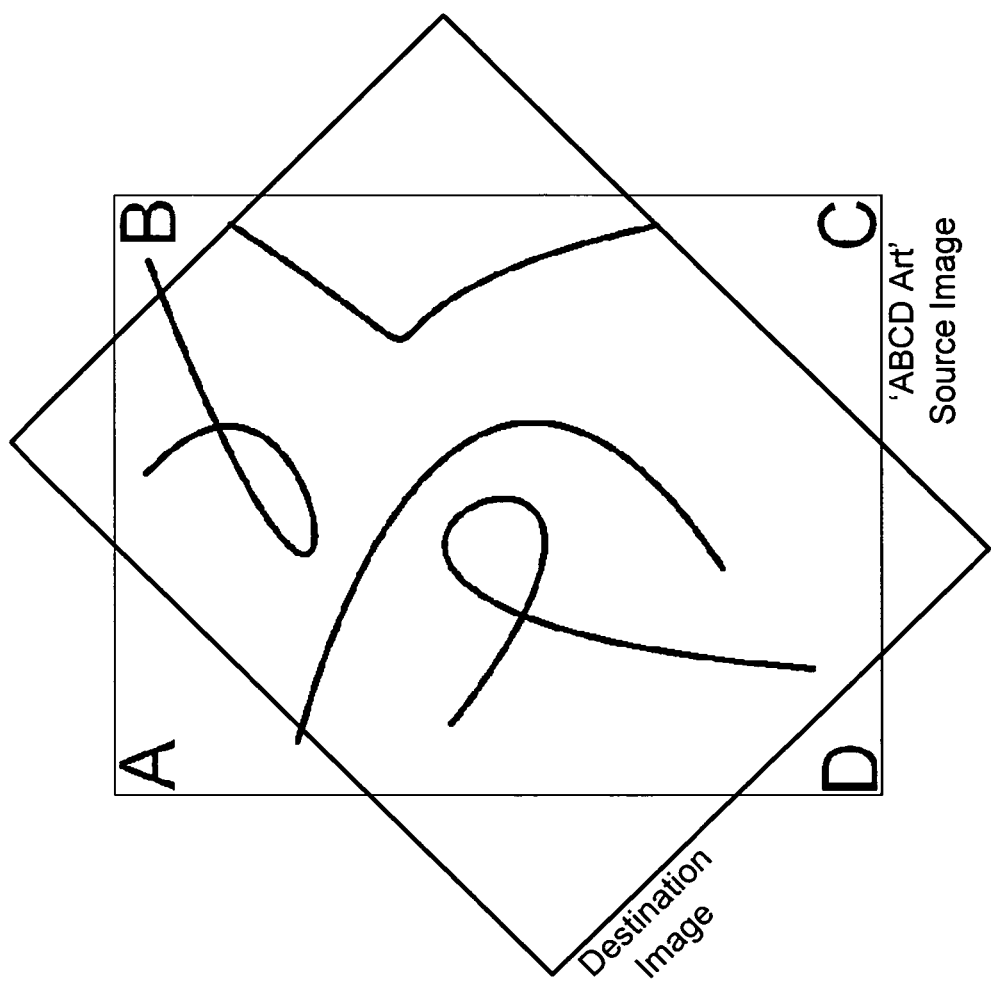
FIG. 14 illustrates a source image for rotation overlaid with the destination template.
Figure 15:
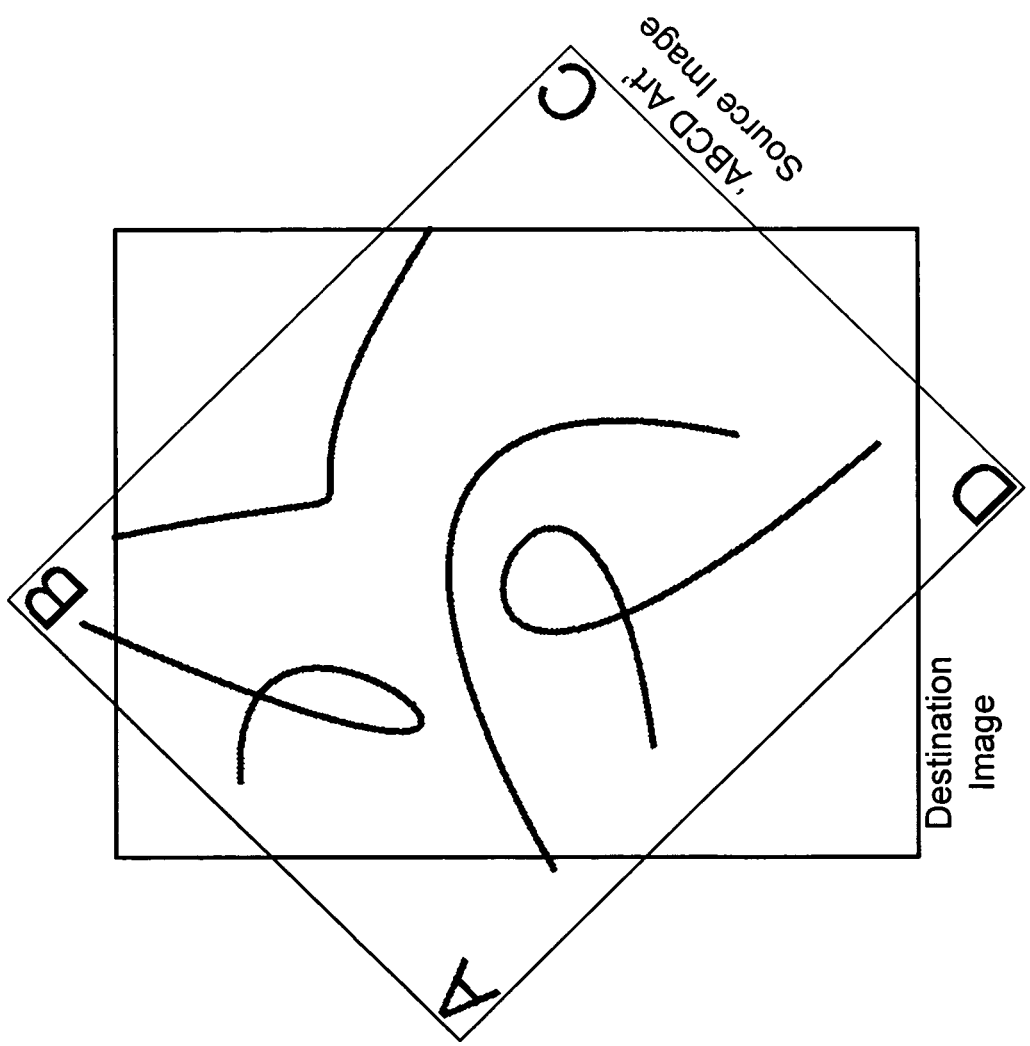
FIG. 15 illustrates a source image for rotation overlaid with the angle of the destination image.
Figure 16:
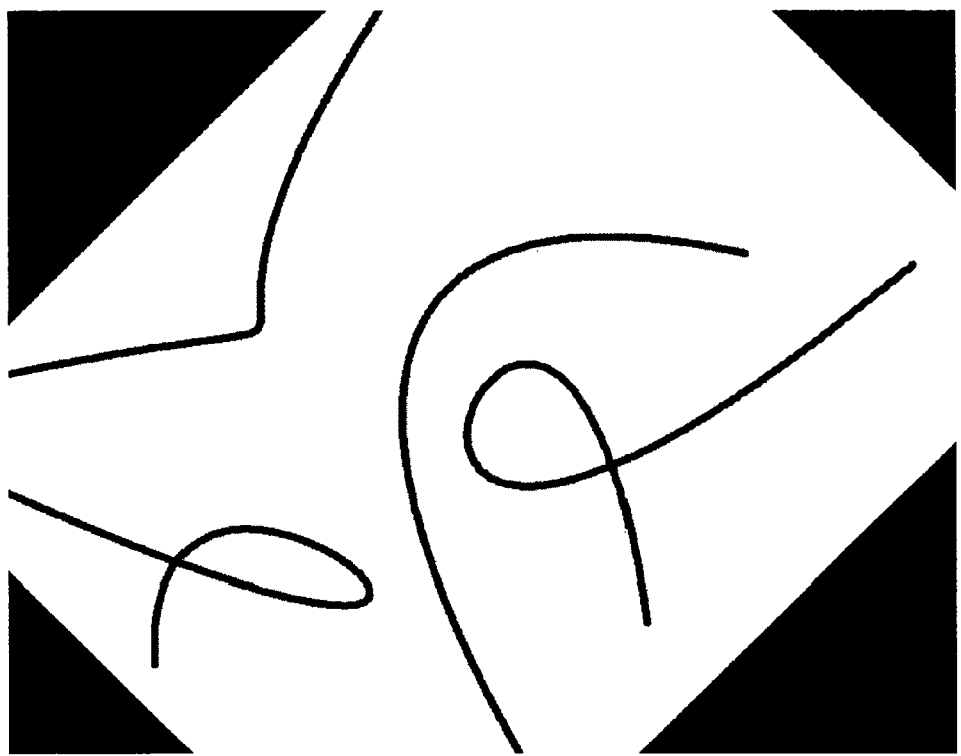
FIG. 16 illustrates the destination image that results from rotation of the source image in FIG. 14.
Figure 17:
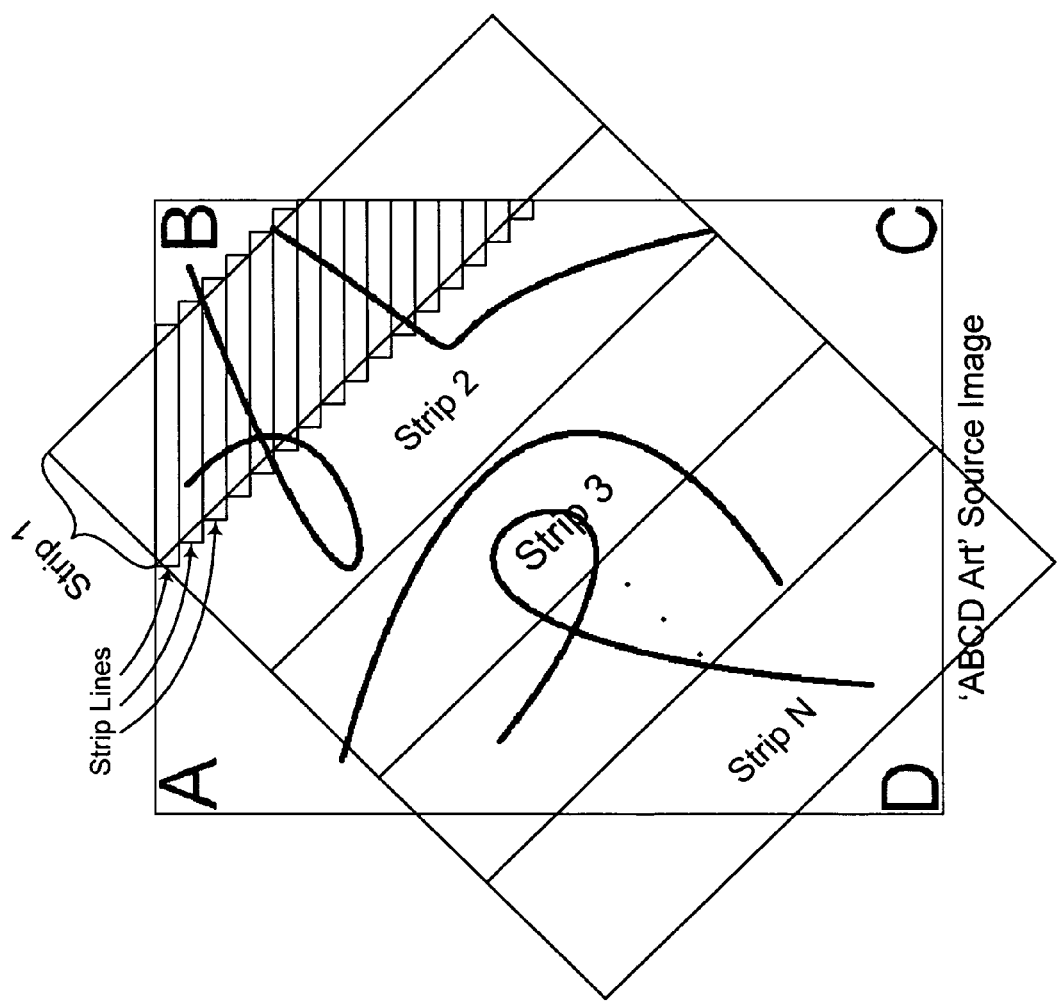
FIG. 17 illustrates how the destination template in FIG. 14 is broken into slices, and each slice aligns with lines of pixels within the slice.
Figure 18:
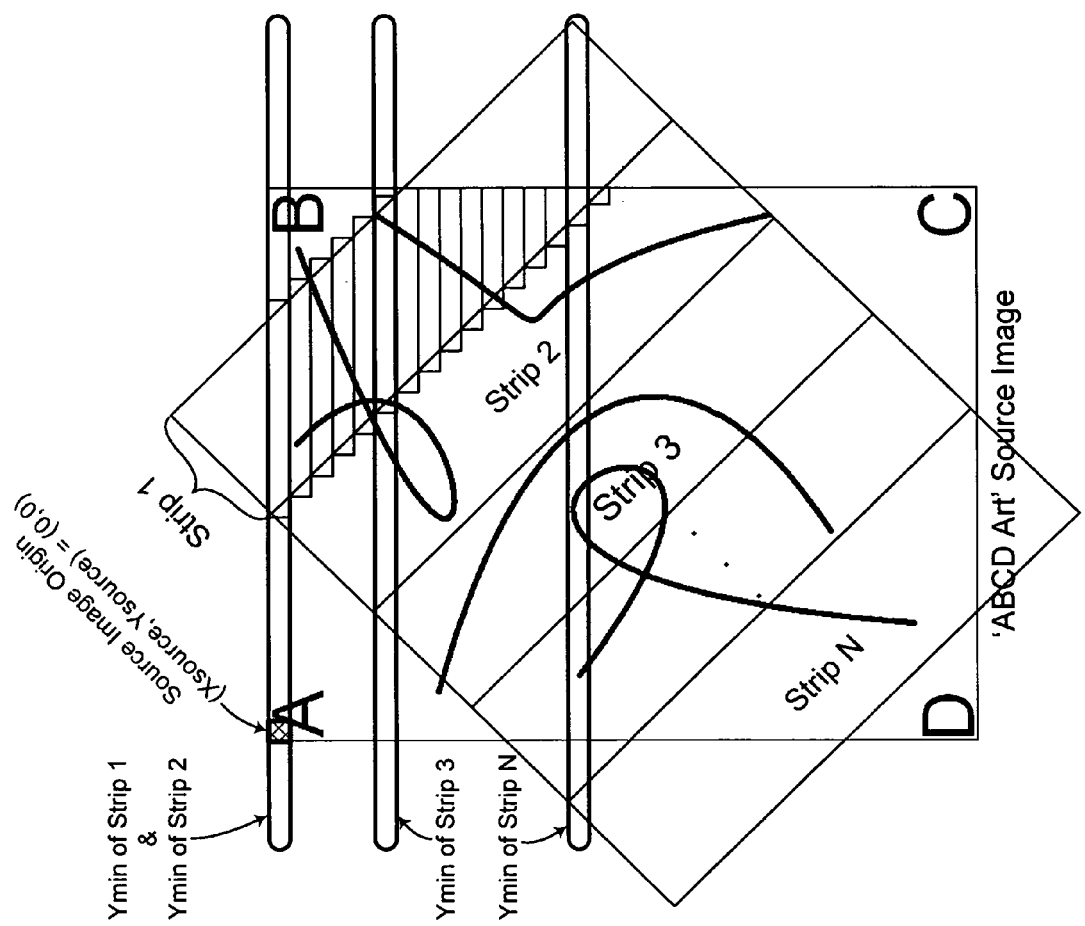
FIG. 18 illustrates the relationships between the slices in FIG. 17 and the Ymin for each slice.
Figure 19:
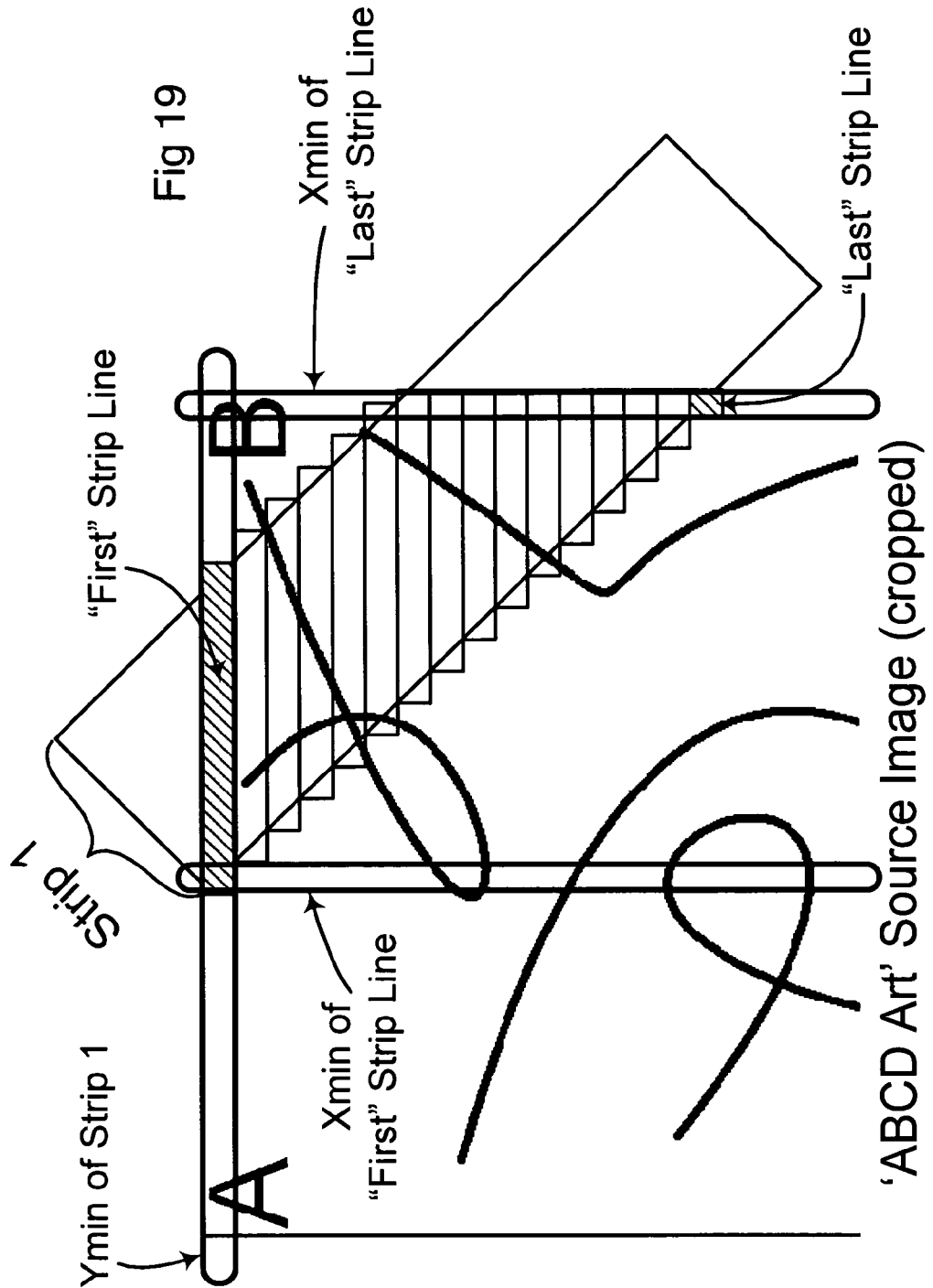
FIG. 19 illustrates the relationships between the Ymin for each line and the corresponding Xmin.
Figure 20:
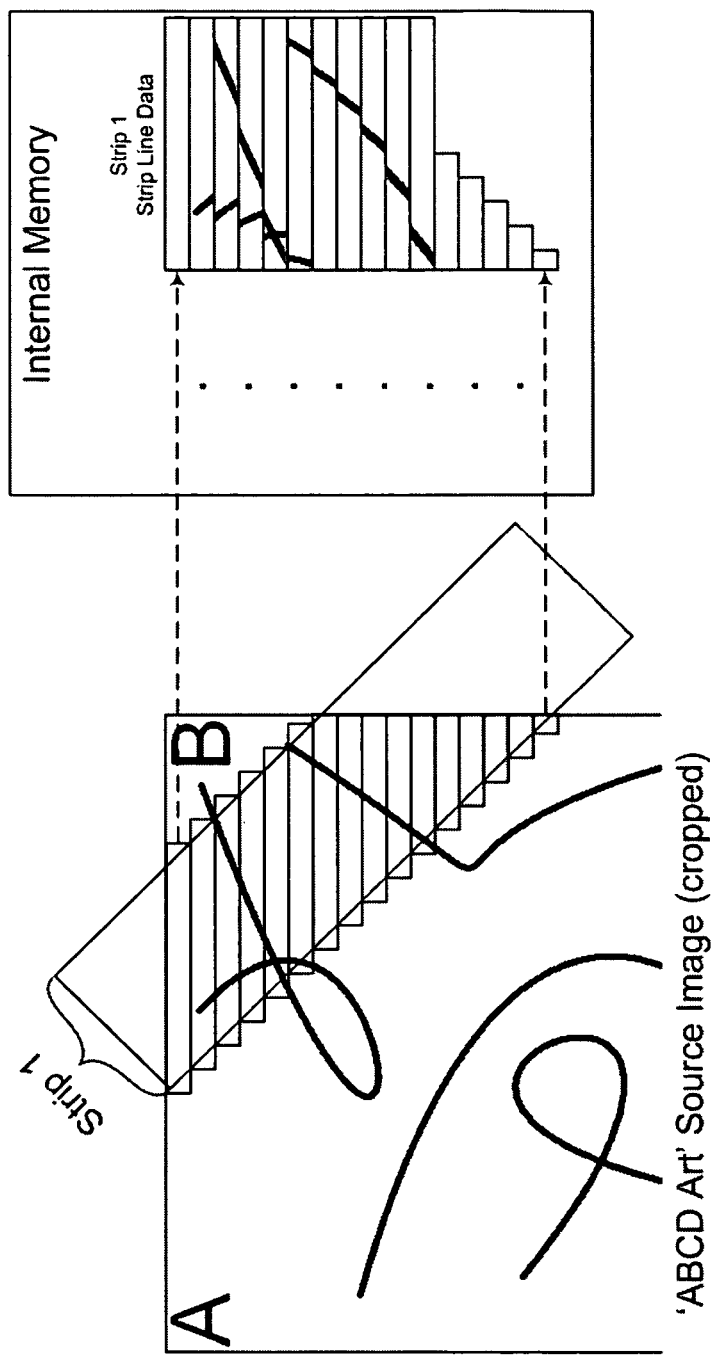
FIGS. 20-24 illustrate how image data from the slices are stored in internal memory.
Figure 21:
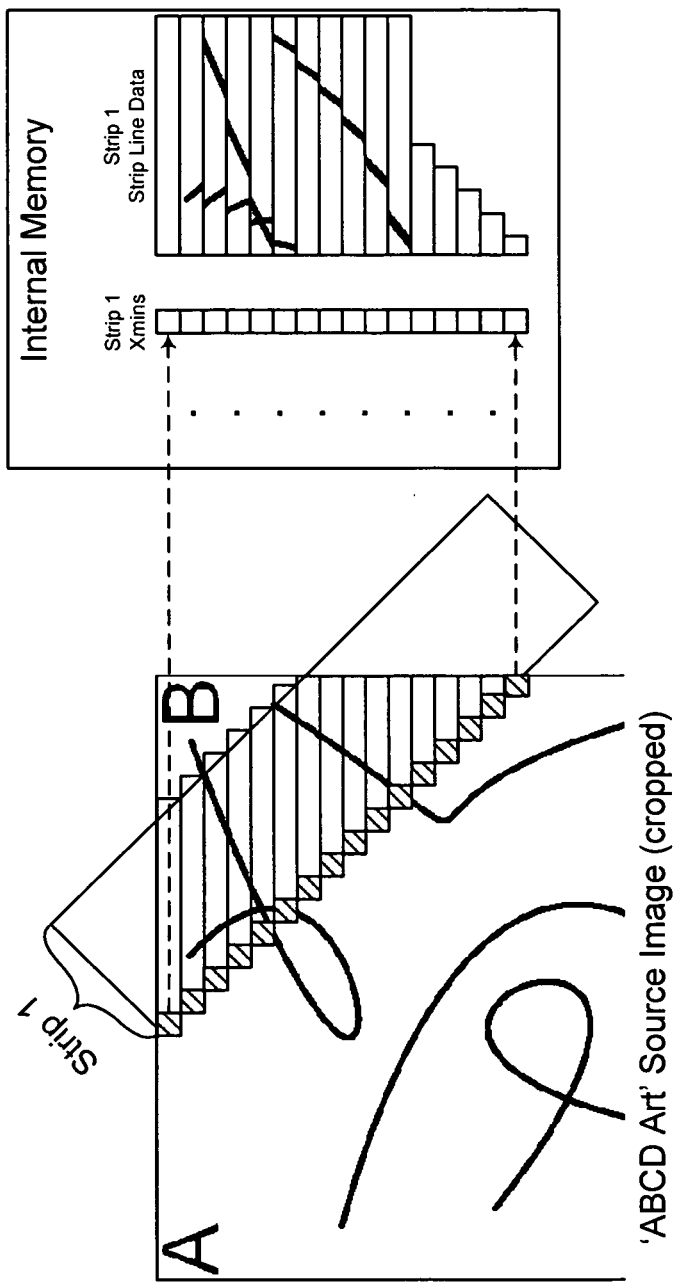
Figure 22:
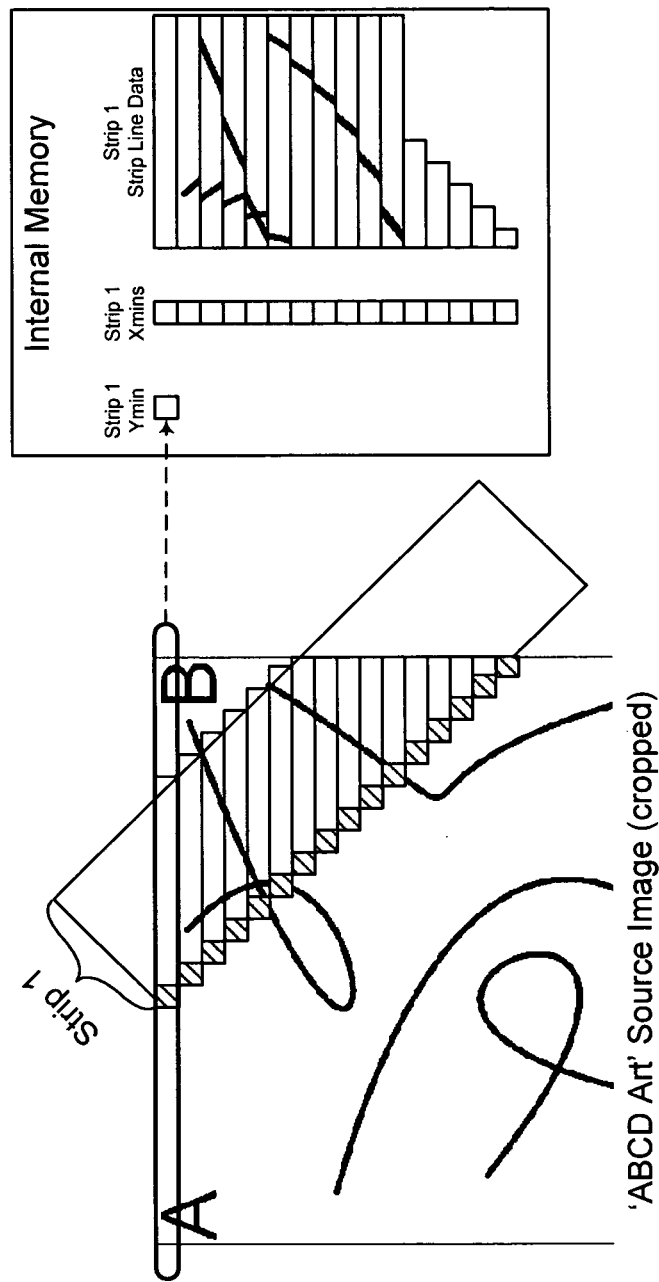
Figure 23:
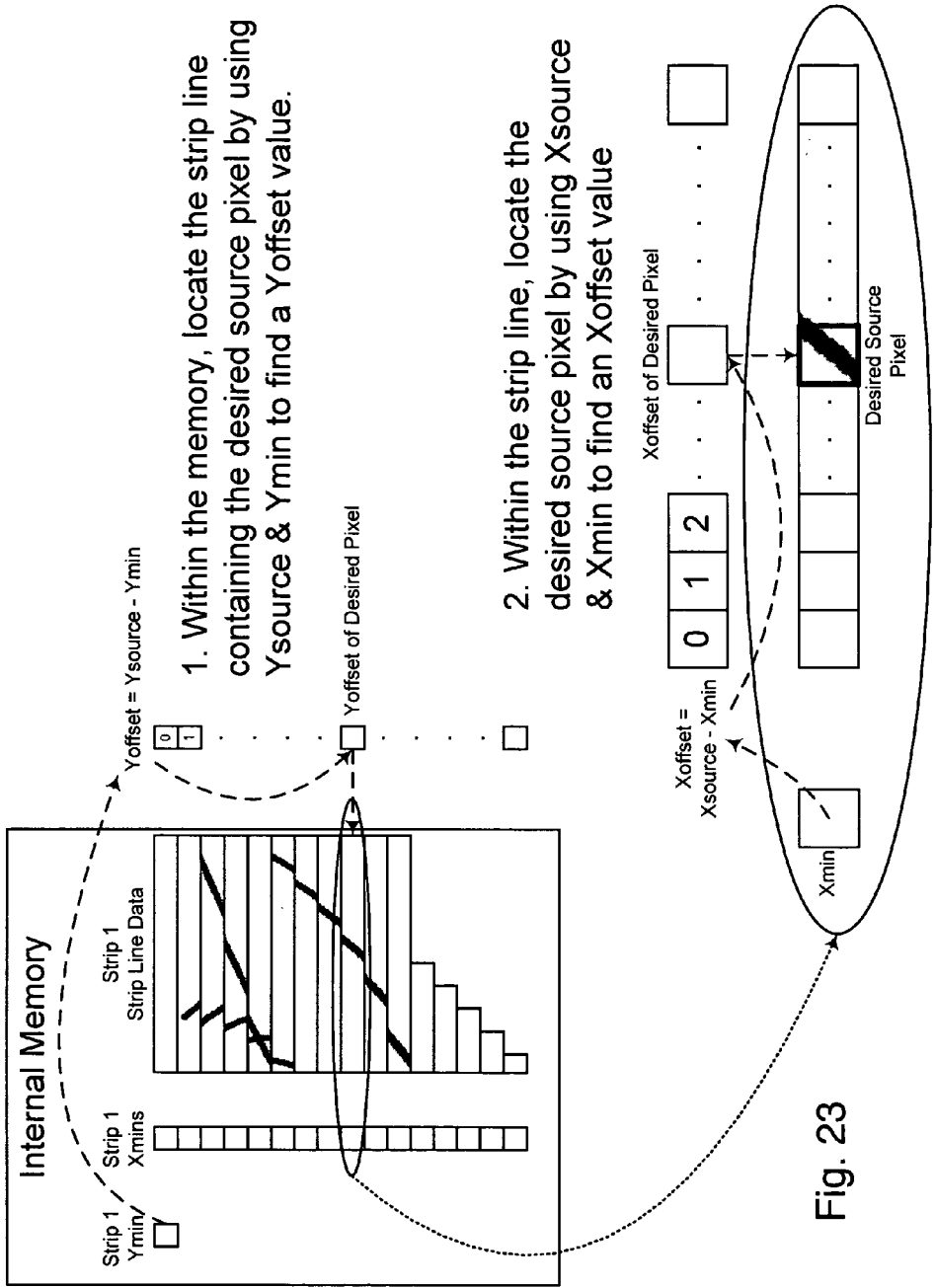

For this illustration, a real world system implementation is used by way of non-limiting example. Referring now to FIGS. 3 and 11, the functionality of FIG. 2 is preferably incorporated into an FPGA chip 310 operating in cooperation with one or more external SDRAMs 315 1-n mounted on a video card 305. Three such sets 320 are shown in FIG. 3 with two SDRAMs each, although any number can be used as desired. The different sets 320 may have overlapping or different functions with respect to different displays. For example, the same video card 305 can drive three different displays for three different images, for which each set 320 can be independently assigned.

The FPGA preferably houses the hardware definition language (HDL) code that accepts user control, makes up the rotation algorithm module, and provides an interface to the external DDR SDRAM, and provides streaming image data input to, and output from, the rotation module. The SDRAM provides the mass memory to store the input source image 110.

Figure 4:
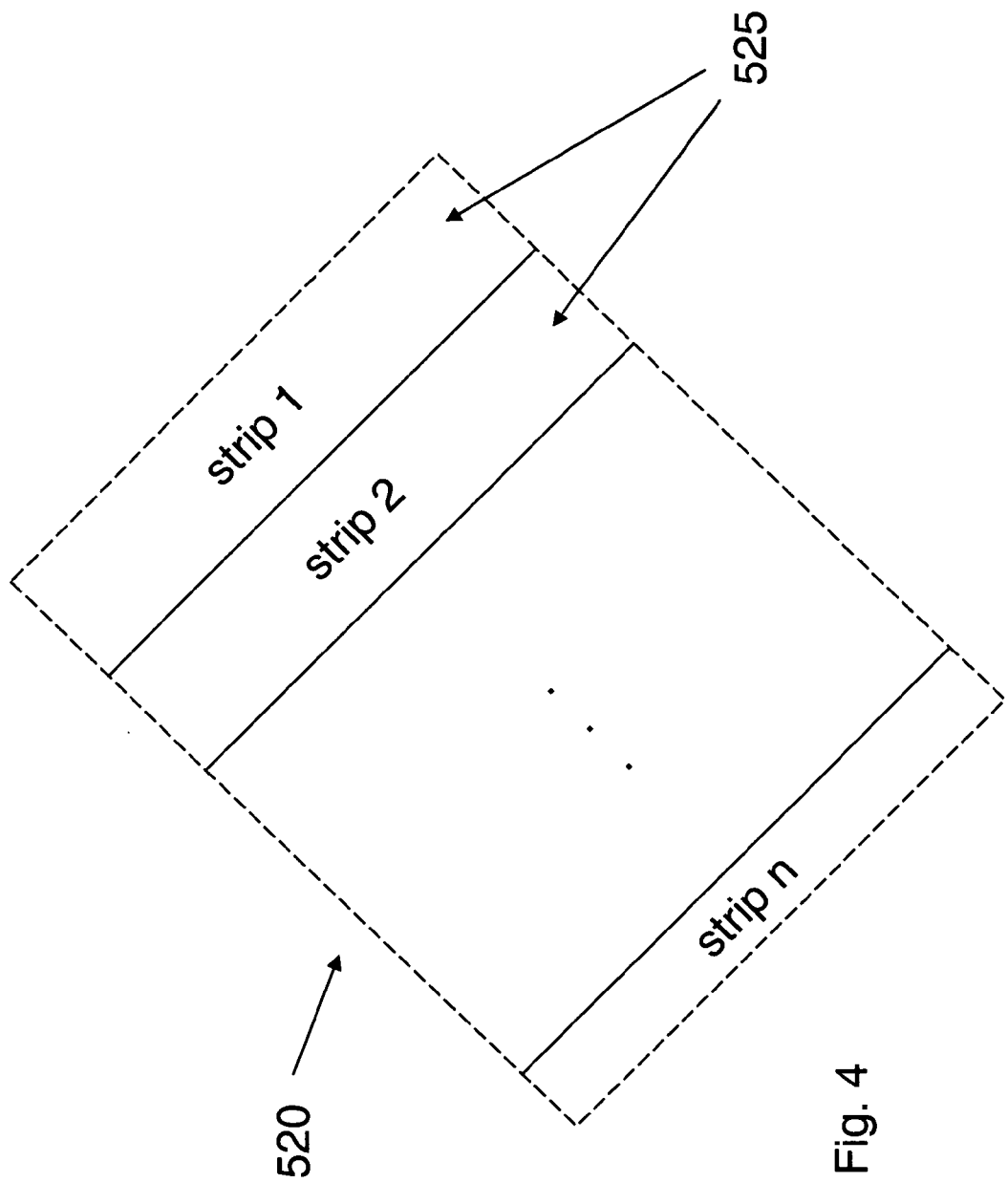
FIG. 4 illustrates a destination template.

Referring now to FIG. 4, the methodology for organizing pixel information from the source image 110 is shown at a conceptual level. A destination template 520 is created having the desired size and shaped of the destination image 120. The destination template 520 is preferably the same dimensions as source image 110, but need not be so. Destination template 520 is also rotated by an amount equal to the desired rotation for destination image 120, albeit in the opposite direction. Thus, where the destination image 120 in FIG. 3 is 30 degrees counterclockwise rotation relative to source image 110, destination template 520 is rotated 30 degrees in the clockwise direction in FIG. 4.

Destination template 520 is subdivided into strips 525 1-n. Each strip 525 is preferably rectangular, and has a length that runs the length of destination template 520. Each strip 525 1-n is also preferably the same size, save for perhaps for a single end strip 525 n which may need to be a different shape to account for the size of source image 110, although the invention is not so limited and the strips may be of different sizes and/or shapes. Strips 525 are also shown as contiguous, although they are preferably overlapping to avoid artifacts within the destination image.

The size and shape of strips 525 are previously determined by processor module 240. The determination is based on, e.g., the desired angle of rotation, the size of source image 110, and the size of the desired destination image 120, although other non-limiting factors of examples that could be factors include the size of the internal prefetch memory segmentation size 235 1-n, data bit width into the internal prefetch memory 235 1-n, and/or pixel size.

Figure 5:
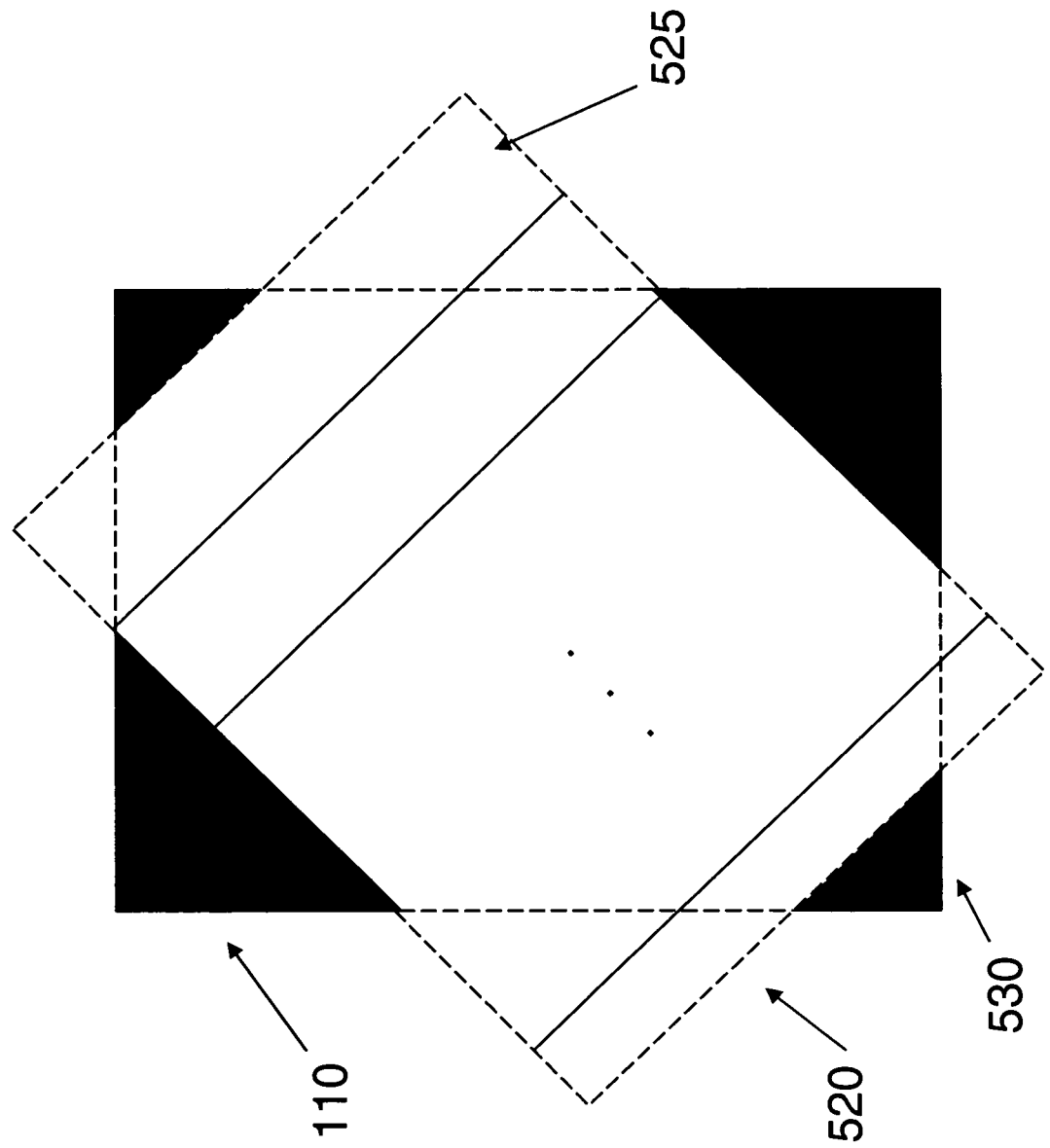
FIG. 5 illustrates an overlap between a source image and a destination template.

Referring now to FIG. 5, the destination template 520 is laid over the source image 110 to represent a rotation of source image 110 about its central axis by the desired angle of rotation, albeit as discussed above in the opposite direction. For ease of discussion and clarity of the figure, the image contents of source image 110 are not shown in FIG. 5. The overlap of source image 110 and rotation template 520 may create a variety of dead zones 530 in which no image exists for rotation. As discussed more below, these dead zones can be ignored by the system processing. While FIG. 5 shows strips 525 in visual format, they exist within the system as a bounded set of coordinates within source image 110.

Strips 525 overlap with sequential rows of pixels 610. FIG. 6 exaggerates the size of the pixel rows 610 for clarity, although it is to be understood that the height of the rows matches the height of the pixels in source image 110.

Figure 7A:
FIGS. 7A-C illustrate how boundaries of the strips are identified by pixel coordinate data.

Referring now to FIG. 6, based on the various available rotation parameters, processor module 240 determines the minimum and maximum Y coordinates (Ymin and Ymax) of the highest and lowest pixels rows 610 within each strip 525. For ease of discussion, explanation is limited to the first slice 525 1, although the process is the same for other strips 525. For example, the Ymin of strip 525 1 would be Y=0, as zero is the highest point in the source image; similarly, the Ymax coordinate is the Y coordinate of lowest pixel within the overlap of source image 110 and strip 525 1. This establishes an upper and lower boundary of the strip 525 1. FIG. 7A visually shows the information provided by Ymin and Ymax for strip 520 1.

Figure 7B:
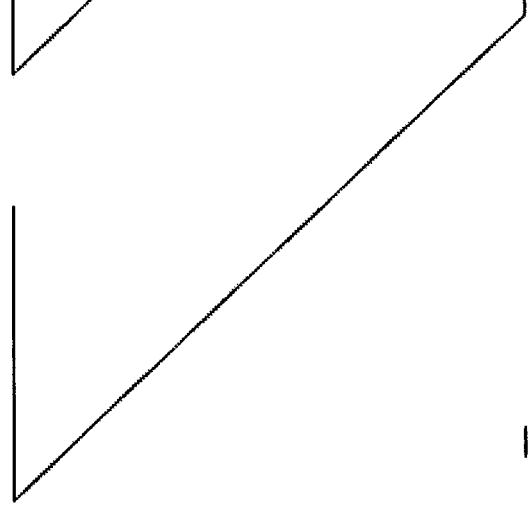
Figure 7C:
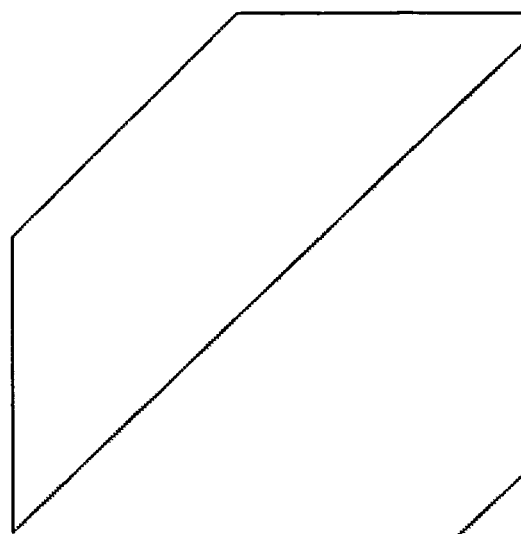

Processor module 240 also calculates, for each horizontal row of pixels between Ymin and Ymax, the leftmost X coordinate of the pixel within that row (Xmin), as shown in FIG. 8 (shown as a line for clarity, but in actuality is a zigzag). This establishes a left side boundary of strip 525 1, as shown in FIG. 7B. Finally, processor module 240 determines the length of each horizontal row of pixels, such that it knows the right side boundary of strip 525 1 as the Xmin+the row length as shown in FIG. 7C.

The processor module 240 thus identifies, via this coordinate data, the strip parameters for strips 525 and forwards the same to prefetch control 230. As discussed more below, prefetch control 230 will process the source image 110 based on the strip parameters to format the image data for rotation. Discussion will be based for each on the visual representation of the strips 525 and corresponding data, although it should be understood that the actual processing occurs at the hardware/software level.

Referring now again to FIG. 2, prefetch control 230 now desires to read pixel data out from source image 110 for the area which overlaps with the first strip 525 1. Prefetch control 230 will accordingly provide a command 260 to the SDRAM read control 225 to read out the pixel data for the first of pixel rows 610, providing the Ymin coordinate for that row, the Xmin coordinate for that row, and the X-length of that row. Thus, all pixels within the first row of overlap are sequentially read by SDRAM read control 225, sent to the prefetch control 230 via 270 and stored in pre-fetch RAM memory 235. The process then repeats with the prefetch control 230 providing a command to the SDRAM read control 225 to read out the pixel data for the next pixel row 610, and so on until all pixel rows 610 within the overlap are stored in memory 235. Pixel rows 610 can also be read in different order than above.

Figure 9:
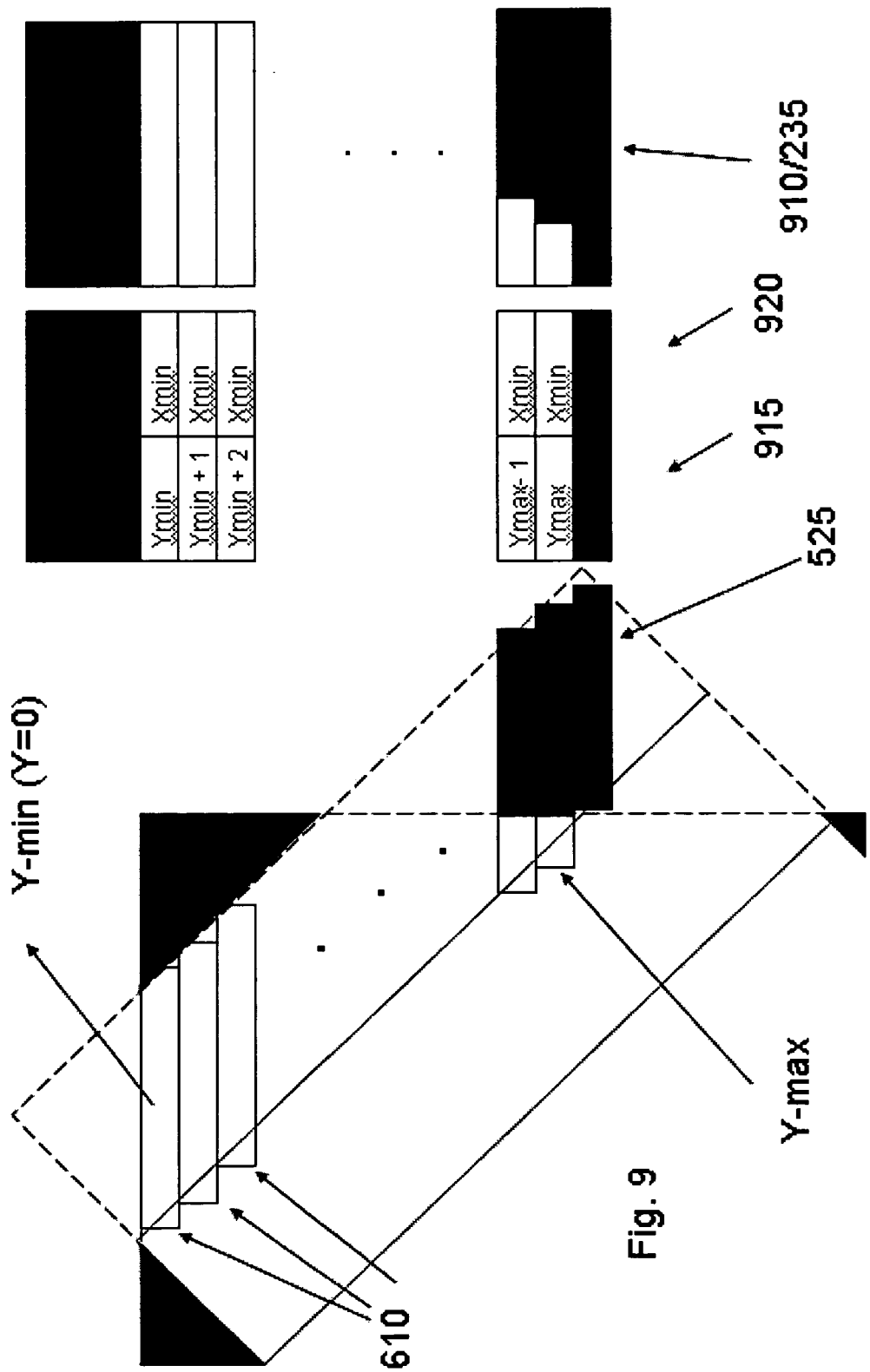
FIG. 9 illustrates the correspondence between pixel data scanned from a strip and indexing and storage in prefetch control.

FIG. 9 is a visual representation of how the pixel row data scanned from source image 110 is stored in a portion of memory 910 of prefetch memory 235. The portion of source image 110 which is covered by the first strip 525 1 is now scanned into prefetch memory 910. This is done by reading out each row of pixels 610 sequentially out of the image. The prefetch strip storage control 232 will begin the pixel scan with the leftmost pixel in the top row of the first row of pixels 610. The pixels are then read sequentially from left to right until the entire first row of pixels 610 is completely read into memory 910/235. The system then goes to the next row of pixels 610, locates the left most pixel, and begins again. This process continues until all pixels within the overlap between source image 110 and strip 520 1 are read into prefetch memory.

The system preferably does not rely upon 1-1 address correspondence between a needed pixel and its location. Rather, the system preferably relies upon an offset from the available minimums. Thus, locations of pixels are selected by being in the fifth row down from the Ymin, and second pixel over from the Xmin. Tables 915 and 920 provide the Ymin, Xmin, and offset information so that any particular pixel of interest can be quickly located. Dead zones represent no image data and are shown in FIG. 9 as blacked out.

The above process repeats until all of the strips 525 are read into prefetch memory 235 and indexed.

In the above embodiment, dead zone space is neither analyzed nor stored. Prefetch 230 can be informed that the dead zone space is not recorded and is preprogrammed to automatically respond with appropriate data, such as a black pixel. In the alternative, data indicating dead zone status can be initially loaded into the relevant portions of prefetch memory 235. In another alternative, the dead zone spaces can be analyzed and processed as any other pixel, although the pixel data would be nonexistent and so reflected in prefetch memory 235.

The rotation module 250 "rotates" the source image 110 into destination image 120 by essentially creating a new image from the pixel data in prefetch memory 235. A rotation algorithm with rotation modulate 250 must compute, for each output pixel in the destination image 120, a corresponding pixel within the source image 110. This is preferably done by starting with the upper left hand corner of the destination image, at location (0, 0), and computing a starting source X & Y pixel location. The rotation algorithm then goes pixel-by-pixel from left to right across, and line-by-line down, the destination image, and computes corresponding X & Y source pixel locations for the algorithm to retrieve source pixel data from.

In the system presented in FIG. 2, the rotation algorithm has a direct high-speed interface to source image segments in the internal prefetch memory 235. The process for retrieving pixel data consists of using X-source and Y-source coordinate values to generate addresses, and subsequently X & Y offset values, that are associated with the desired data residing in the prefetch memory. Thus, the presented design is viable for applications where anti-aliasing isn't required. In a more complex rotation algorithm that implements anti-aliasing, each computed source pixel location will correspond to multiple source image pixels, since in a majority of cases, the computed X-source and Y-source values will not fall precisely on a single pixel. In using bilinear interpolation for anti-aliasing, each computed source pixel location will correspond to retrieving the four closest adjacent source image pixel words from the prefetch memory. The fractional portion of the X-source and Y-source coordinates defines how close the desired pixel location is to each of the four adjacent source pixels. Therefore, the fractional portions of the X-source and Y-source coordinates are used to calculate the weighting factors applied to the four retrieved source pixels. The final destination pixel word value will then be a sum of the four weight-multiplied source pixel word values. This anti-aliasing methodology is well-known and not discussed in further detail. The corresponding methodology could also be used for techniques other than anti-aliasing.

Figure 10B:
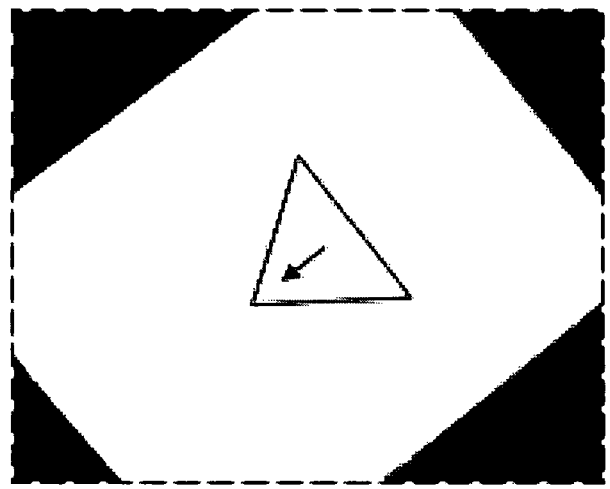
FIGS. 10A and 10B illustrate the source image and resulting destination image.
Figure 10A:
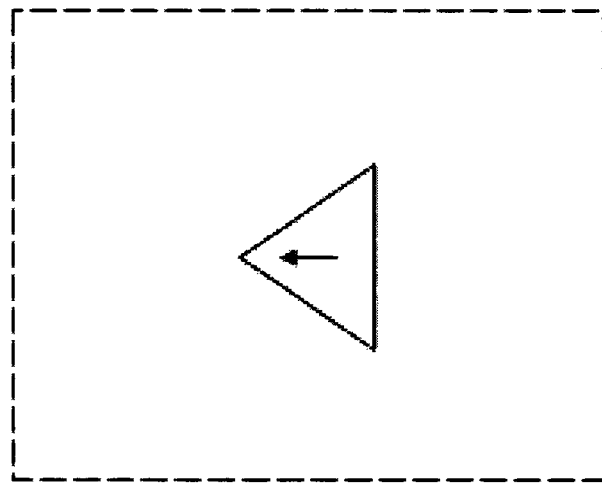

Rotation module 250 outputs output pixel data 280, which includes the resulting destination image 120 as shown in FIGS. 10A and B. The destination image can be output as a single image, or streaming on the fly as the pixels of the destination image 120 are generated. The destination image is then displayed on an appropriate display. As seen in FIG. 10B, image information from the source image 110 that was in the dead zones 530 are outside the boundaries the image, and thus do not appear. Also, portions of the destination template 520 that did not overlap with source image 110 contain no information, and thus either do not appear at all or appear as new dead zones in the destination image 120.

As discussed above, the rotation of source image 110 into destination image 120 tends to produce dead zones which appear in destination image 120. However, the invention is not so limited. The destination image 120 can be expanded via zooming or panning (often referred to as translation) to minimize or eliminate the dead zones 530, although this will likely result in some portions of the source image 110 being lost or not visible. In the alternative, the strips 525 can be sized to lie within the boundaries of the source image 110, such that there are no dead zones in the overlap, although again likely some information in the source image 110 will be lost or not visible.

The size of pixel data may not always perfectly match the size of various storage elements herein. For example, a typical RGB pixel tends to require 24 bits, whereas an SDRAM storage operates using 32 bits. It may be necessary to incorporate packing and unpacking methodologies to store, retrieve and process pixel data, particularly when reading from or writing to buffer array 220 and memory 235.

Referring now to the embodiment of FIGS. 12-25, the basic idea when calculating the strip parameters is to create the largest strip possible to maximize use of the limited internal memory and SDRAM bandwidth. The strip width is set equal to the destination image width. The algorithm starts with a thin strip, by estimating a small strip height, and calculates the associated strip parameters. The algorithm iteratively increases the estimated strip height until it and the destination strip height are equal, or close, such that the largest, most efficient strip has been formed, where the entire strip fits within the internal memory. For efficiency, this process can execute in parallel to loading the source frame into the SDRAM buffer. The strip parameters can then be stored away until the buffered frame gets rotated.

There are three main strip parameters that get calculated, which define the strip: destination strip height, strip line length, and number of strip lines. The destination strip height is used by the processing function to ensure that only the strip-related destination pixels, where source pixels exist in the strip, get source pixel locations calculated. The strip line length is used to burst a source image row to out of memory. All three parameters are used to calculate the amount of internal memory the strip consumes.

Figure 24:
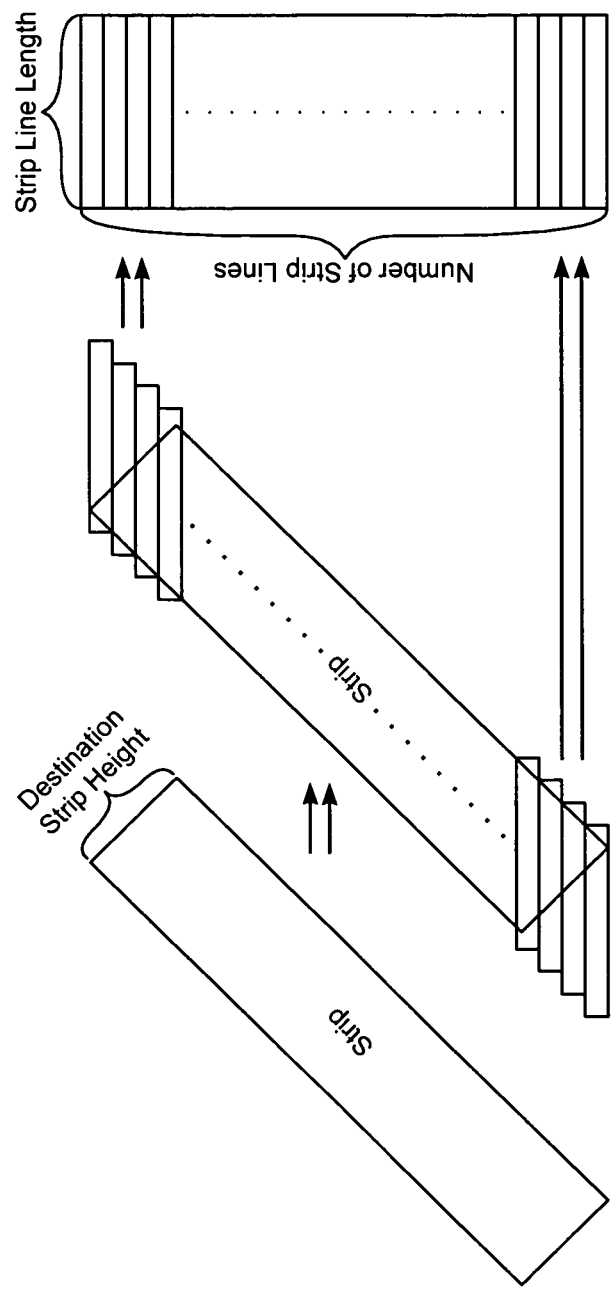
Figure 25:
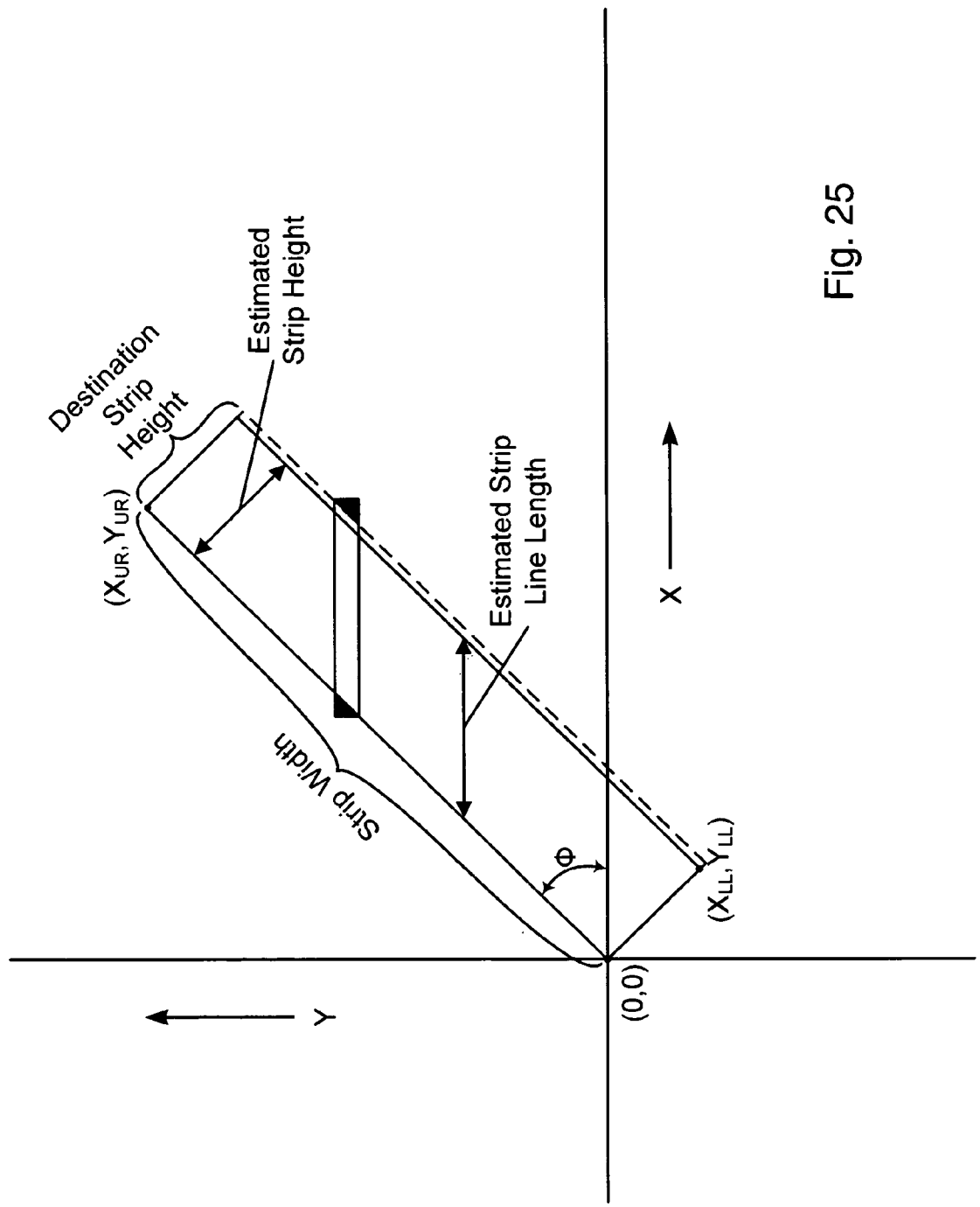
FIG. 25 illustrates the geometry of a slice.

The strip can be visualized as a rectangular box (shown in FIGS. 24 and 25). For illustrative simplicity, the strip's upper left corner will reside at the origin of an X-Y graph, with the majority of the strip extending into the positive-positive X-Y quadrant. The strip is at an angle equal to the destination template (the negative of the rotation angle). The width dimension of the rectangular strip, the strip width, is equal to the destination image width. Based on the angle and the strip width, the upper right corner of the strip rectangle ($X_{UR}, Y_{UR}$) can be calculated. The estimated strip height, for the current iteration, and the angle are used to calculate the lower left location of the strip box ($X_{LL}, Y_{LL}$). The number of strip lines value is approximately the count of strips lines between the upper right corner and the bottom left corner, $Y_{UR}$ minus $Y_{LL}$. The number of strip lines increases to take into account anti-aliasing, rounding, and compensation related to $Y_{LL}$ moving during strip line length calculations.

The strip line length is calculated using the number of strip lines and the memory constants: the size of the internal memory, the width of the internal memory interface, and image pixel size. The calculated strip line length is an integer multiple of the memory interface width (in pixels). Therefore, the calculated strip line length likely will not be the same as the estimated strip line length, which is determined by the estimated strip height. This difference will cause a shift in $Y_{LL}$.

The rectangular strip is shown to have straight, parallel lines, but realistically the edges have a stair-step pattern. Since a strip line must cover all possible source values within the strip, the strip line must extend over the strip top and strip bottom, shown black in the strip line in FIG. 25. This effectively reduces the strip line length, resulting in an adjusted strip line length. The adjusted strip height is used to calculate the destination strip height.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for rotating a source image by a first non-zero angle, comprising:
    defining a template for the source image, the template representing a rotation of the source image about an axis of the source image by a second angle, where the second angle is the negative of the first non-zero angle that the source image is to be rotated;
    determining overlap between the template and the source image;
    separating the template into a plurality of strips covering at least the area of overlap between the template and the source image;
    for each strip:
        identifying an initial pixel in the source image within the strip and storing the image data of the initial pixel;
        storing the image data of all remaining pixels within both the strip and the overlap in a database format in which the all remaining pixels is defined by a Y and X offset from the initial pixel, wherein said storing the image data of all remaining pixels within both the strip and the overlap further comprises:
            determining the initial pixel with coordinates in the source image as Ymin and Xmin; establishing an origin pixel as having Y=Ymin and X=Xmin;
            obtaining the image data sequentially for the origin pixel and each horizontally adjacent pixel from the origin pixel until the end of the overlap is reached,
            storing the image data in a database format in which each horizontally adjacent pixel is defined by the offset from Ymin and an offset from Xmin;
            incrementing the Ymin by one if there are any remaining pixel rows within both the strip and the overlap; and
            repeating at least the establishing, obtaining, storing and incrementing until all of the pixels within both the strip and the overlap are stored;
    constructing a desired rotated image from the source image,
    for each pixel in the rotated destination image, identifying at least one pixel from the source image that corresponds to the source image as rotated per the first angle, the identifying comprising:
        identifying the strip that corresponds to the target section of the source image; and
        using the X and Y offset data to locate the image data in the database format.

2. The method of claim 1, wherein the initial pixel with each strip is the highest Y coordinate and leftmost X coordinate within each strip.

3. The method of claim 1, wherein the each of the strips at least partially overlaps with adjacent strips.

4. The method of claim 1, wherein the strips are substantially parallel.

5. The method of claim 1, wherein the strips are substantially rectangular.

6. The method of claim 1, wherein the image data for portions of the strips that do not overlap the source image are ignored.

7. The method of claim 1, wherein the image data for portions of the strips that do not overlap the source image are stored in memory as representative of dead zone data.

8. A method for rotating a source image by a first non-zero angle, comprising:
    defining a template for the source image, the template representing a rotation of the source image about an axis of the source image by a second angle, where the second angle is the negative of the first non-zero angle that the source image is to be rotated;
    determining overlap between the template and the source image;
    separating the template into a plurality of strips covering at least the area of overlap between the template and the source image;
    for each strip:
        determining the initial pixel with coordinates in the source image of the corresponding strip as Ymin and Xmin, wherein the initial pixel with each strip is the highest Y coordinate and leftmost X coordinate within each strip;
        establishing an origin pixel as having Y=Ymin and X=Xmin;
        obtaining the image data sequentially for the origin pixel and each horizontally adjacent pixel from the origin pixel until the end of the overlap is reached;
        storing the image data in a database format in which each horizontally adjacent pixel is defined by the offset from Y and an offset from X;
        incrementing the Ymin by one if there are any remaining pixel rows within both the corresponding strip and the overlap; and
        repeating at least the establishing, obtaining, storing and incrementing until all of the pixels within both the strip and the overlap are stored;
    for each pixel in the rotated destination image, identifying at least one pixel from the source image that corresponds to the source image as rotated per the first angle, the identifying comprising:
        identifying the strip that corresponds to the target section of the source image;

using the X and Y offset data to locate the image data in the database format.

9. The method of claim 8, wherein the each of the strips at least partially overlaps with adjacent strips.

10. The method of claim 8, wherein the strips are substantially parallel.

11. The method of claim 8, wherein strips are substantially rectangular.

12. The method of claim 8, wherein the image data for portions of the strips that do not overlap the source image are ignored.

13. The method of claim 8, wherein the image data for portions of the strips that do not overlap the source image are stored in memory as representative of dead zone data.

* * * * *